United States Patent [19]

Someya et al.

[11] Patent Number: 5,091,784
[45] Date of Patent: Feb. 25, 1992

[54] MATRIX TYPE IMAGE DISPLAY APPARATUS USING NON-INTERLACE SCANNING SYSTEM

[75] Inventors: Ryuuichi Someya, Chigasaki; Nobuaki Kabuto; Yuichiro Kimura, both of Yokohama; Kazuhiro Watanabe, Ishioka, all of Japan

[73] Assignees: Hitachi, Ltd.; Hitachi Automotive Engineering Company, both of Tokyo, Japan

[21] Appl. No.: 578,006

[22] Filed: Sep. 4, 1990

[30] Foreign Application Priority Data

Sep. 7, 1989 [JP] Japan ................................. 1-230377
Sep. 8, 1989 [JP] Japan ................................. 1-231488

[51] Int. Cl.⁵ ............................................. H04N 3/14
[52] U.S. Cl. .................................... 358/183; 358/241; 340/784
[58] Field of Search ............... 358/140, 236, 105, 241, 358/183; 340/784

[56] References Cited

U.S. PATENT DOCUMENTS 4,694,348 9/1987 Kamiya et al. ................. 358/140 X
4,935,815 6/1990 Ichikawa et al. ............... 358/105 X

FOREIGN PATENT DOCUMENTS 63-26084 3/1988 Japan .
1-289383 11/1989 Japan .

OTHER PUBLICATIONS

Sony V7040, pp. 637-650.

Primary Examiner—Victor R. Kostak
Attorney, Agent, or Firm—Fay, Sharpe, Beall, Fagan, Minnich & McKee

[57] ABSTRACT

Double line sequential scanning is performed on a display apparatus which displays, for example, a television signal and a character and graphics signal. When only a television signal is to be displayed, priority is given to the resolution of the image. When a character an graphics signal is to be displayed superimposed on the television signal, double line sequential non-interlace scanning is performed by force. In this manner, the problem of sticking or ghosting of the character and graphic images is reduced.

19 Claims, 37 Drawing Sheets

ODD FIELD SCAN. LINE NO. — TV-SIGNAL SCANNING LINE — EVEN FIELD SCAN. LINE NO.

ODD FIELD SCAN. LINE NO. — INTERLACE INDICATION (DOUBLE LINE SEQUENTIAL INTERLACE SCANNING) — EVEN FIELD SCAN. LINE NO.

ODD FIELD SCAN. LINE NO. — NON-INTERLACE INDICATION — EVEN FIELD SCAN. LINE NO.

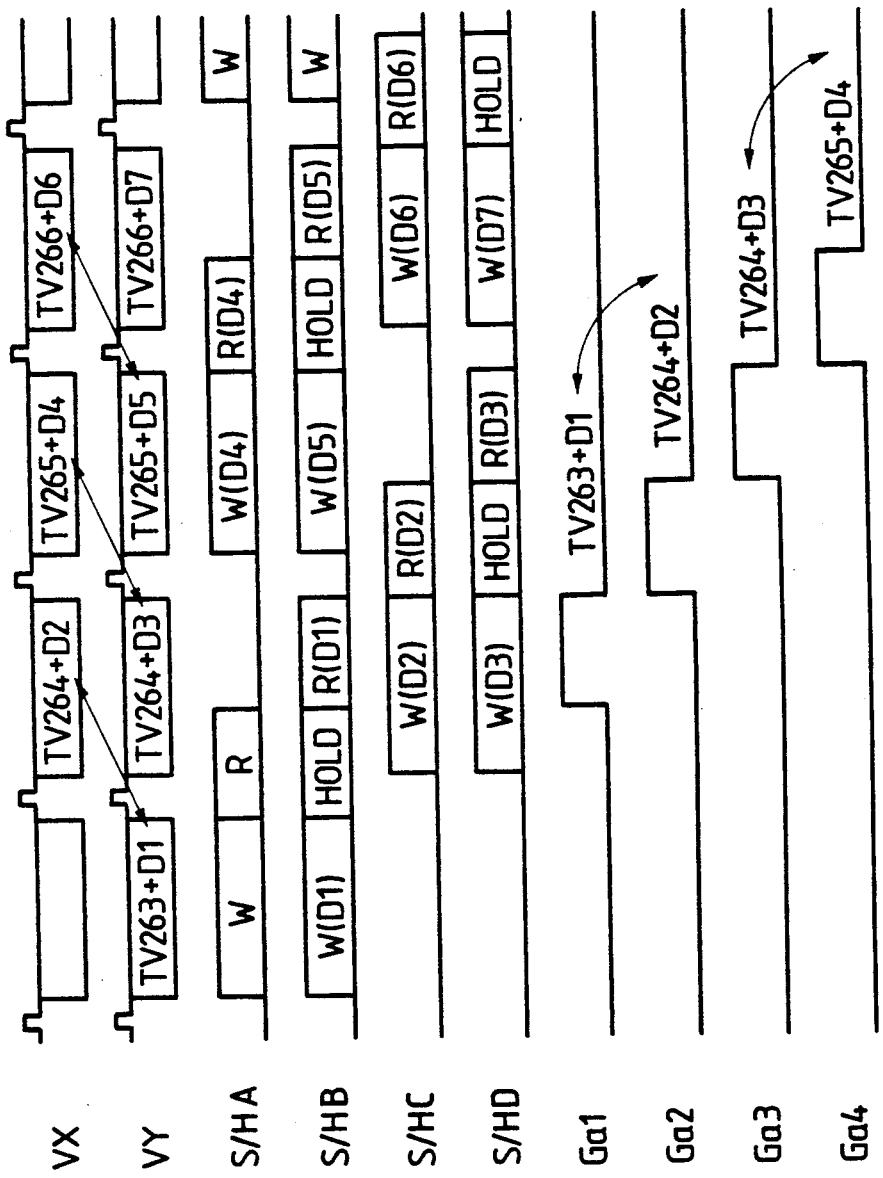

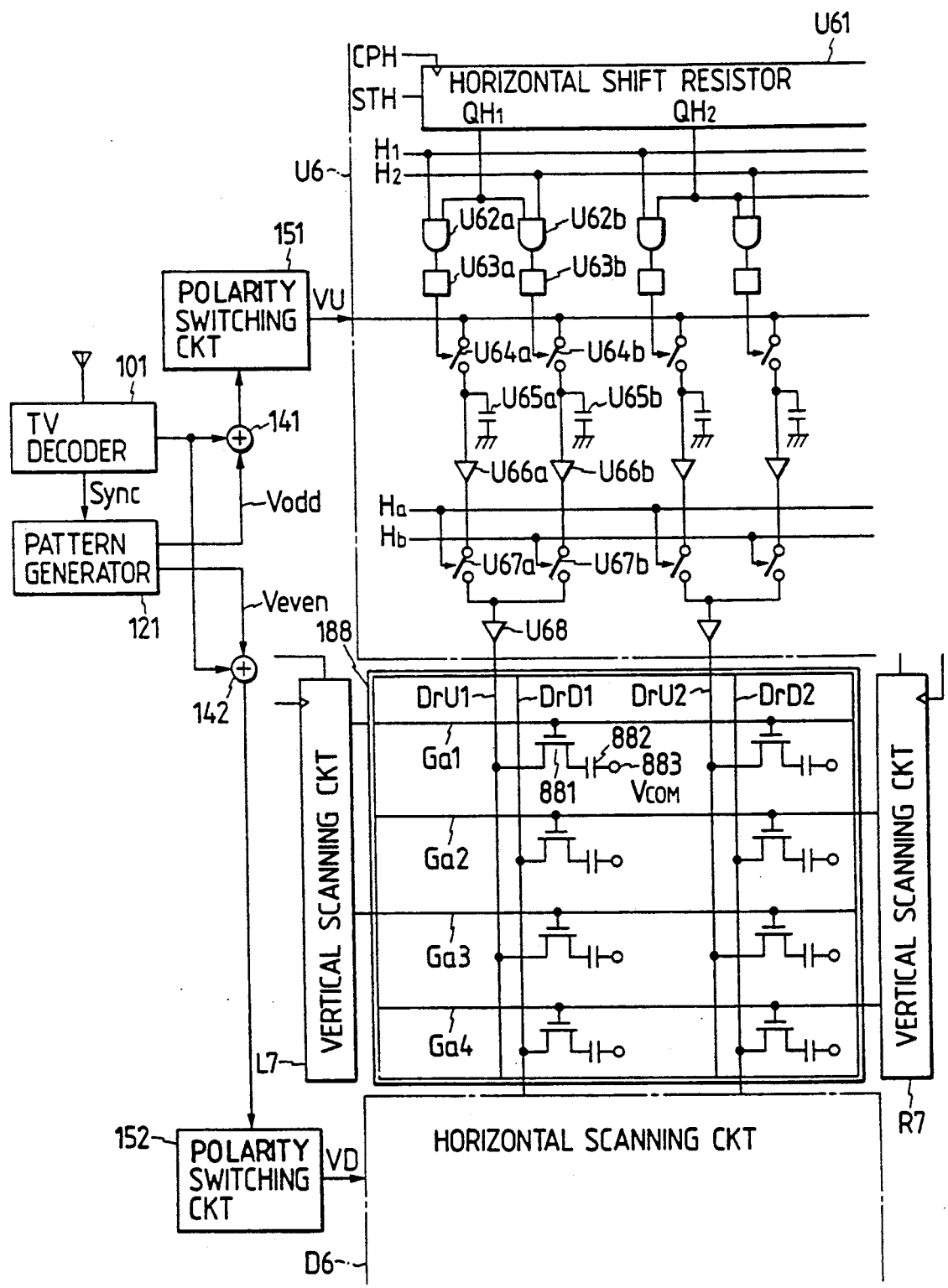

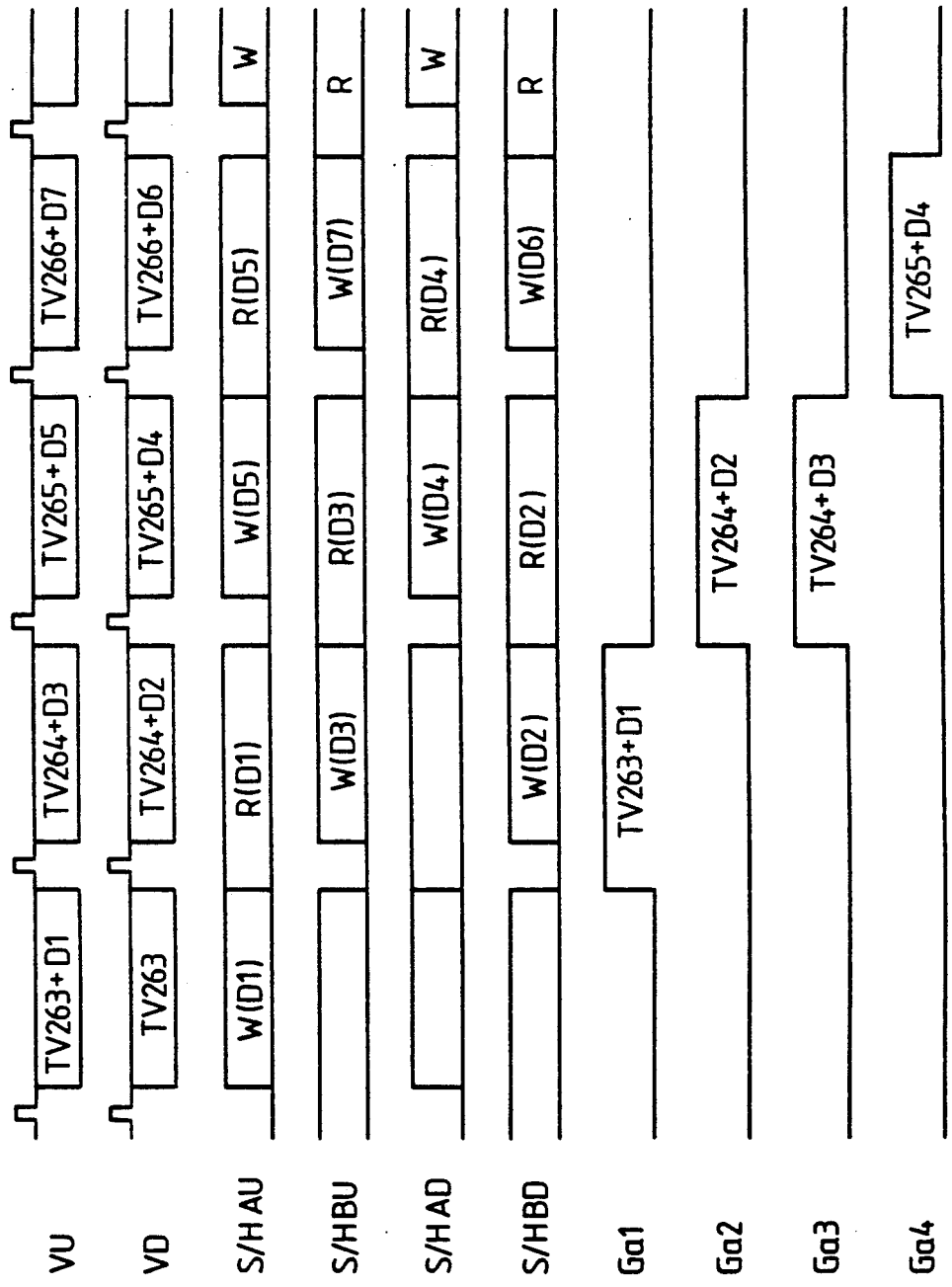

MATRIX TYPE IMAGE DISPLAY APPARATUS USING NON-INTERLACE SCANNING SYSTEM

BACKGROUND OF THE INVENTION

The present invention relates to an image display apparatus, e.g., a liquid crystal display apparatus, used in a television receiver. It finds particular, in a liquid crystal television receiver that uses the so-called "double line sequential interlace" scanning system, in which the scanning lines on a screen of one field are doubled. This doubles the number of displayed pixels in the vertical direction of the screen are doubled. The apparatus generates a display of (i) television images on an interlace scanning system, (ii) a display of characters and graphics on a non-interlace scanning system, and a display by force of a character and graphic image superimposed on a television image without deteriorating the quality of the picture image. Although the preferred embodiment is explained below in conjunction with a liquid crystal display, by way of example, it is to be appreciated that the invention is also applicable to other video and graphics display devices.

Japanese Laid-open Patent Publication No. 63-26084, "Double Line Sequential Scanning Circuit", discloses a circuit a liquid crystal display panel is provided with liquid crystal display elements or the elements are pixels arranged in a matrix array at the intersecting points of a plurality of horizontally extended scanning electrodes and a plurality of vertically extended signal lines. The display elements are adapted to be driven when both of the electrodes are driven simultaneously. It is thereby made possible to have a television signal (hereinafter sometimes simply referred to as "TV signal") on an interlace scanning system displayed on the panel without deteriorating the vertical resolution of the image.

More specifically, in the aforesaid prior art, the same horizontal scanning signal is stored in two sample-and-hold circuits, for example. The signal electrodes arranged in the vertical direction on the liquid crystal display panel are sequentially driven by the stored signals, while two lines of the liquid crystal display elements on the panel screen are scanned in one horizontal scanning period of the television signal. During this scanning operation, the combination of two lines in the first field of the television signal and the combination of two lines in the second field are shifted with respect to their phases. In this manner, double line sequential scanning is achieved.

FIG. 1a to FIG. 1c are drawings which illustrate scanning in such a double line sequential interlace scanning system.

FIG. 1a is a schematic diagram showing ordinary interlace scanning of a TV signal. If it is assumed that scanning lines 23H, 24H, 25H, . . . written in solid lines are scanning lines in the first field (hereinafter sometimes referred to as "ODD field"), then the broken lines 285H, 286H, 287H, . . . represent the scanning lines in the second field (hereinafter referred to as "EVEN field"). In this case, the scanning lines in the ODD field and the scanning lines in the EVEN field are inserted between each other (i.e., shifted with respect to their phases) so that the resolution in the vertical direction is enhanced.

FIG. 1b is an explanatory diagram of the double line sequential interlace scanning system on a liquid crystal panel screen.

Referring to FIG. 1a, if it is assumed that there is an image expressed by the slant-lined band covering both the scanning line numbers 23H and 286H, the image, when displayed on the liquid crystal panel screen on the double line sequential interlace scanning system, becomes as shown in FIG. 1b.

More specifically, in the ODD field in FIG. 1b, the horizontal scanning line 23H, which should originally be that for one horizontal line, is used two times for scanning the first line (L1) and second line (L2). By so doing, the number of scanning lines in the ODD field is doubled, i.e. becomes equal to the sum total of scanning lines in one frame.

The same is true for the EVEN field. In the EVEN field, the second line and third line, shifted downward by one line from those in the ODD field on account of the interlace scanning system, are scanned two times by the 286th horizontal scanning line. However, similarly to the above, the number of the scanning lines in one field is doubled.

In the liquid crystal panel screen using the double line sequential interlace scanning system, problem arise when still pictures, i.e. character and graphic data are displayed rather than television pictures with brisk movements.

As an example of such character and graphic data, consider the one image line shown by the slant-lined band shown in FIG. 1a, for example, Referring now to FIG. 1b, since the one line is displayed according to the double line sequential interlace scanning system in this case, the one line is displayed as two lines along the first and second lines in the ODD field. The same one line is also displayed as two lines along the second and third lines in the EVEN field as described above.

As a result, the line is widened or stretched vertically. When the image is viewed during one frame period, the one line is displayed along three lines on the screen, namely, the first line on the screen (during the ODD field period), the second line on the screen (during the ODD field and EVEN field periods), and the third line on the screen (during the EVEN field period). Then, the resultant image originally of one sharp line becomes a thick three line image with blurred edged. Therefore, a problem arises in that the resolution of the image is deteriorated.

Further, if the three lines are examined from the point of view of the driven liquid crystal display elements on the screen, then, as shown in FIG. 1b, the first line is driven in the first field and not driven in the second field. The second line is driven in both the fields. The second fields, and the third line is not driven in the first field and is driven in the second field. That is, symmetrical driving is performed along the second line during the period of the first and second fields but asymmetrical driving is performed along the first line and the third line.

During asymmetrical driving, a D.C. component remains applied to the liquid crystal display elements. This causes flickering on the screen (as described in the reference, Papers to be Read on the 14th Forum on Liquid Crystal, 2B109 (1988)). Also, there was a problem of sticking or ghosting, i.e., a fixed pattern remaining observable on the screen due to existence of internal electric field even after the applied D.C. component has disappeared.

One prior art technique for preventing the trouble was to adopt a non-interlace scanning method. More specifically, a signal on the non-interlace system was input as a character and graphic signal. The same first and second lines were driven to be displayed as two lines in both the ODD field and in the EVEN field as shown in FIG. 1c.

In the above described prior art, no consideration was made of a superimposed display of a character and graphic signal (a signal on a non-interlace scanning system) on a TV signal for moving pictures (a signal on an interlace scanning system).

SUMMARY OF THE INVENTION

One object of the present invention is to provide a display apparatus, perferably a liquid crystal display apparatus, which is capable of superimposing a plurality of signals on different scanning system. For example, a TV signal on an interlace scanning system and a character and graphic signal on a non-interlace scanning system are superimposed without deteriorating the quality of the image picture. To achieve this object, the display apparatus performs double line sequential interlace scanning when only a TV signal is displayed to attain a high resolution. Double line sequential non-interlace scanning is performed by force when a character and graphic signal is superimposed on a TV signal to reduce sticking of the character and graphic signal.

When a mixed signal obtained by adding a TV signal and a character and graphic signal together is displayed as a superimposed display, a non-interlace display system is switch-selected by force. Although the resolution of the picture image of the TV signal is deteriorated to a certain degree, the sticking of the character and graphic signal can be reduced.

The above mentioned double line sequential scanning system can be practiced, for example, by storing the same video signal for one horizontal scanning period temporarily in two line memories (sample-and-hold currents). Each memory is read sequentially so that two lines are driven one by one.

In the present invention, in consideration of possible differences occurring in the video signals to be applied to adjacent two lines on account of irregularity in the arrangement of color filters or positions of pixels, the video signals input to the respective line memories are arranged to be independent of each other. When a TV signal is to be displayed, the independently provided line memories are supplied with the signal of the same horizontal scanning at all times so that interlace driving is maintained. When a display signal for such data as characters and graphics is to be displayed, the signal of the same horizontal scanning is supplied to the input sides of the line memories in the first field. In the second field, the currently received horizontal scanning signal and the signal received one horizontal scanning period before are respectively applied to the input sides of two line memories, so that non-interlace driving is achieved.

At this time, it becomes possible to apply the display signal having the same data (but different in the polarity) to the same line in the first field and the second field to thereby achieve non-interlace driving. Mutually independent line memories (sampling circuits) are provided for driving two lines with one horizontal scanning signal of the television signal. The combination of the two lines driven with the same horizontal scanning signal may be different between the first and the second fields on account of the interlace scanning system, the non-interlace driving is achieved by previously shifting the phase between two display signals (signals for such data as characters and graphics) input to the respective two line memories such that the difference as described above is not produced. That is, the same scanning signal is applied to the two line memories in the first field and the currently received scanning signal and the signal received one horizontal scanning period, before are applied to the second field. Thus, the display signal for such data as characters and graphics is displayed superimposed on the television image in high quality without producing blurred edges of the images of characters and graphics or causing trouble of sticking and flickering.

BRIEF DESCRIPTION OF THE DRAWINGS

FIG. 29a and FIG. 29b are diagrams for explaining operations of the embodiment shown in FIG. 28;

FIG. 36 is a diagram showing a configuration of another embodiment of the present invention;

DESCRIPTION OF THE PREFERRED EMBODIMENTS

Figure 1A:
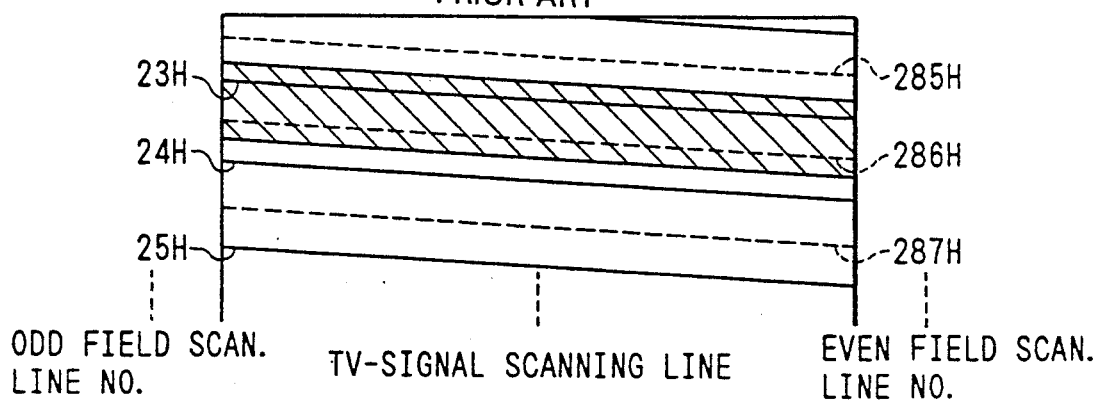
FIG. 1a is a diagram showing scanning lines of a TV signal in the prior art.
Figure 1B:
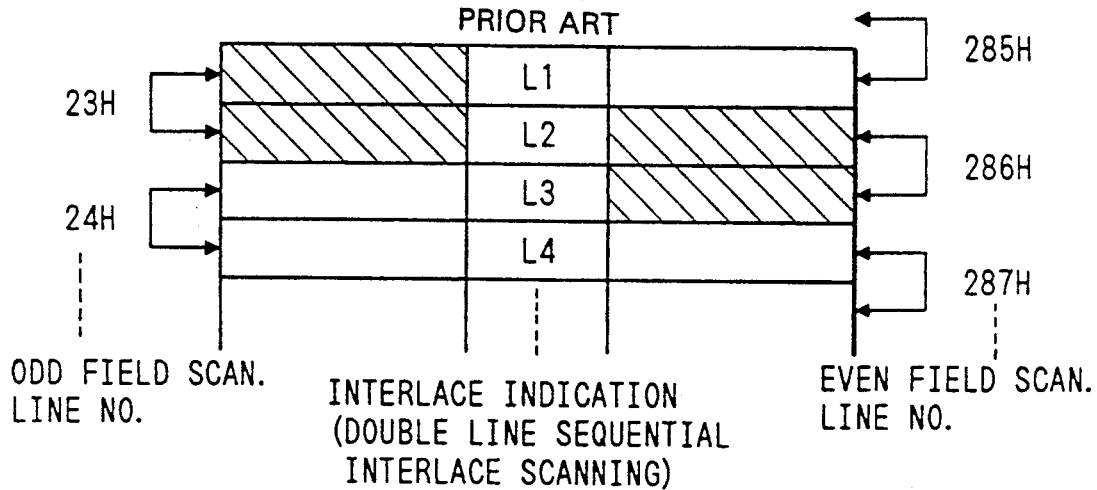
FIG. 1b and FIG. 1c are diagrams showing relationships between the lines on a liquid crystal panel and the scanning line numbers in a double line sequential scanning system and a forced non-interlace system.
Figure 1C:
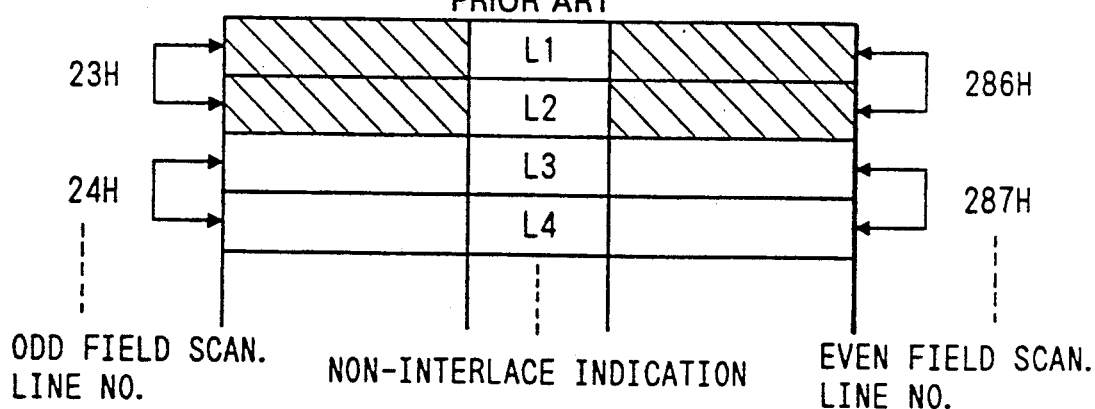
Figure 2:
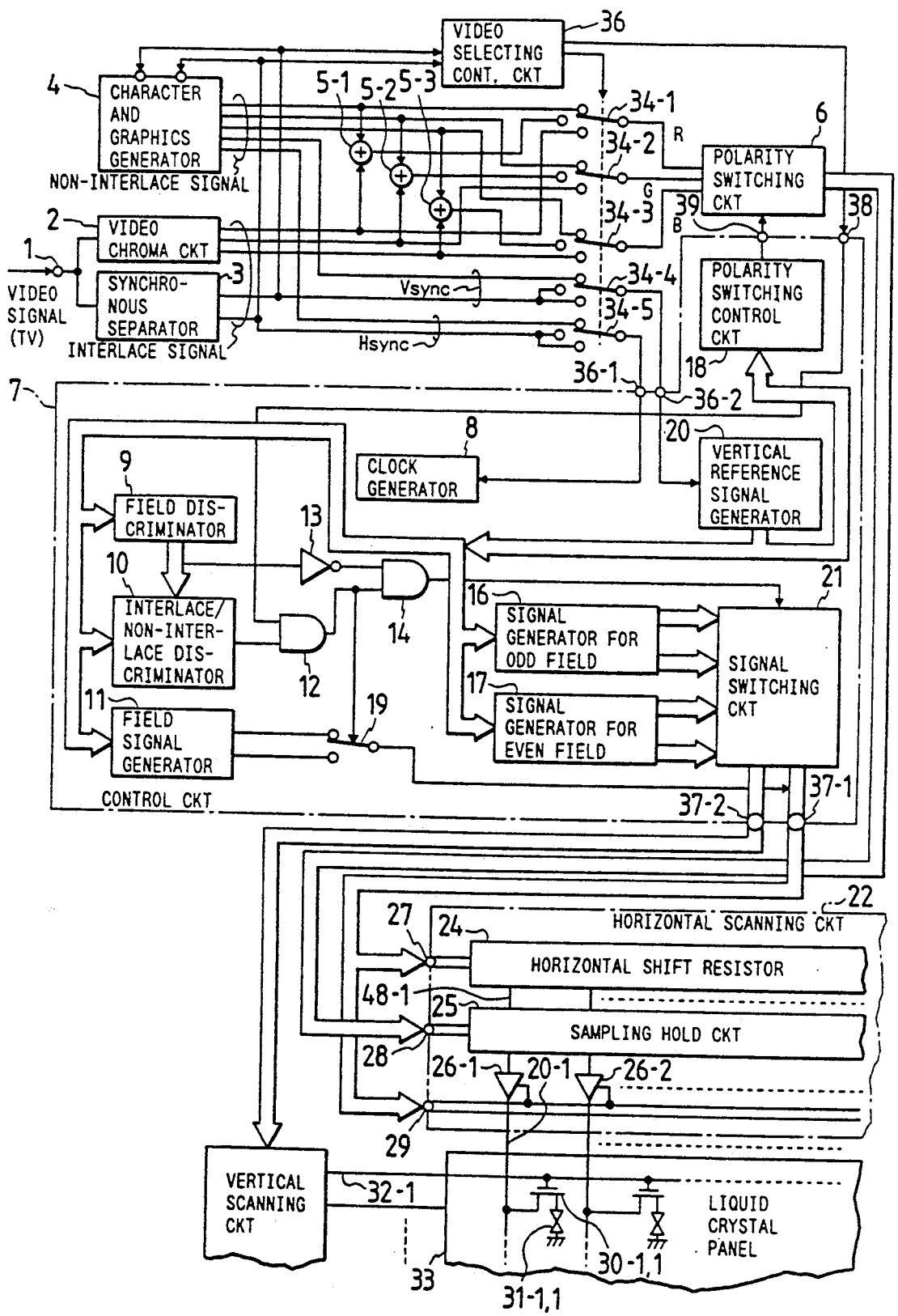
FIG. 2 is a block diagram of a liquid crystal display apparatus as one embodiment of the present invention.

With reference to FIG. 2, a first embodiment of liquid crystal display apparatus capable of a superimposed display comprises a horizontal scanning circuit 22, vertical scanning circuit 23, liquid crystal panel 33, character and graphics generator 4, video selecting control circuit 36, video chroma circuit 2, synchronizing signal separator 3, analog adders 5, selector switches 34, polarity switching circuit 6, and control circuit 7.

The control circuit 7 comprises a clock generator 8, field discriminator 9, interlace/non-interlace discriminator 10, field signal generator 11, signal generator for ODD field 16, signal generator for EVEN field 17, vertical reference signal generator 20, polarity switching control circuit 18, signal switching circuit 21, inverter circuit 13, AND circuits 12 and 14, and selector switch 19. The horizontal scanning circuit 22 comprises a horizontal shift register 24, shift clock 27 therefor, sample-and-hold circuit 25 and video signal input terminal 28 therefor, output buffers 26, and control signal terminal 29.

The liquid crystal panel 33 comprises thin film pixel transistors (TFT) 30 being 480×720 in number, for example the drains and gates of the TFT are respectively selected by the horizontal signal electrodes (20-1) to (20-720) being 720 in number arranged in the horizontal direction and the vertical scanning electrodes (32-1) to (32-480) being 480 in number arranged in the vertical direction. Liquid crystal pixels 31 are connected with the sources of their respectively pixel transistors (TFT).

The operation of the circuit shown in FIG. 2 will be described in the following.

From a video signal input to the input terminal 1, primary signals RGB are generated in the video chroma circuit 2. Horizontal and vertical synchronizing signals are separated in the synchronizing signal separator 3. These signals are output from these circuits. The RGB signals are respectively supplied to the selector switches 34-1, 34-2, and 34-3, and are also supplied to the analog adders 5-1, 5-2, and 5-3. The horizontal and vertical synchronizing signals are supplied to the selector switches 34-4 and 34-5. The selector switches 34-1 to 34-5 are interlocked switches. The following explanation that the video signal applied to the input terminal 1 is an interlaced signal, e.g., a TV signal.

The character and graphics generator 4 also generates primary signals RGB and horizontal and vertical synchronizing signals ($H_{sync}$, $V_{sync}$) but for still picture and are non-interlace signals. These primary signals RGB are also input to the selector switches 34-1, 34-2, and 34-3 and the analog adders 5-1, 5-2, and 5-3. The horizontal and vertical synchronizing signals from the character and graphics generator 4 are also supplied to the selector switches 34-4 and 34-5.

The primary signals R, G, and B added up in the analog adders 5-1, 5-2, and 5-3 are respectively applied to the selector switches 34-1, 34-2, and 34-3. The selector switches 34 are controlled by the output of the video selecting control circuit 36 and select one of the three signals, i.e., the TV signal, the character and graphic signal, and the signal obtained by adding the TV signal and the character and graphic signal. When the TV signal and the character and graphic signal are added together, the selector switches 34-4 and 34-5 select the horizontal and vertical synchronizing signals from the synchronizing signal separator 3.

The character and graphics generator 4 generating the non-interlace signal is externally synchronized by the horizontal and vertical synchronizing signals from the synchronizing signal separator 3. More specifically, the character and graphics generator 4 generates the non-interlace signal having a period of 263H, corresponding to 263 scanning lines, for the first field (ODD field) and a period of 262H, corresponding to 262 scanning lines, for the second field (EVEN field).

The primary signals RGB selected by the selector switches 34-1, 34-2, and 34-3 are switched for polarity, i.e., to positive or negative polarity, in the polarity switching circuit 6 according to a signal output from an output terminal 39 of the control circuit 7.

Figure 3:
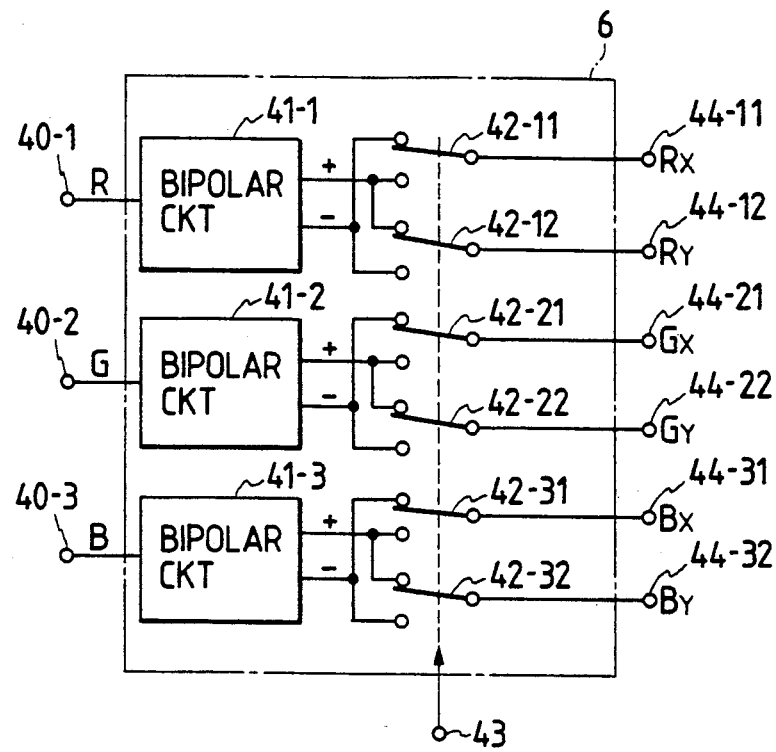
FIG. 3 is a diagram showing a configuration of a polarity switching circuit.

Details of the polarity switching signal 6 are shown in its circuit diagram of FIG. 3. Referring to FIG. 3, the primary signals input to input terminals 40-1, 40-2, and 40-3 are converted to bipolar signals in the bipolar circuits 41-1, 41-2, and 41-3. These signals are switched by the selector switches 42-11 to 42-32 according to the signal supplied to its input terminal 43 (from the output terminal 39 of the control circuit 7 shown in FIG. 2). These signal are output to output terminals 44-11 to 44-32. The polarity switching circuit 6 is a three-input six-output circuit. More specifically, the circuit outputs signals $R_X$ and $R_Y$ at the terminals 44-11 and 44-12 corresponding to the input R to the terminal 40-1 shown in FIG. 3. Signals $G_X$ and $G_Y$ at the terminals 44-21 and 44-22 correspond to the input G to the terminal 40-2. Signals $B_X$ $B_y$ at the terminals 44-31 and 44-32 correspond to the input B to the terminal 40-3. The polarity switching is performed from necessity of A.C. driving of the liquid crystal display elements.

Returning to FIG. 2, the horizontal and vertical synchronizing signals selected by the selector switches 34-4 and 34-5 are respectively applied to the input terminal 36-1 of the clock generator 8 and the input terminal 36-2 of the vertical reference signal generator 20 of the control circuit 7. From these horizontal and vertical synchronizing signals, various clock signals are respectively generated in the clock generator 8 and the vertical reference signal generator 20, and these clock signals are supplied to the field discriminator 9, interlace/non-interlace discriminator 10, field signal generator 11, signal generator for ODD field 16, and the signal generator for EVEN field 17.

The signal out of the vertical reference signal generator 20 is input to the polarity switching control circuit 18 and the polarity switching control circuit 18 in turn generates a signal inverted for each field necessary for controlling the polarity switching circuit 6.

The field discriminator 9 generates a field discriminating signal on the basis of the signals from the clock generator 8 and the vertical reference signal generator 20. This will be described with reference to FIG. 4 and FIG. 5.

Figure 4:
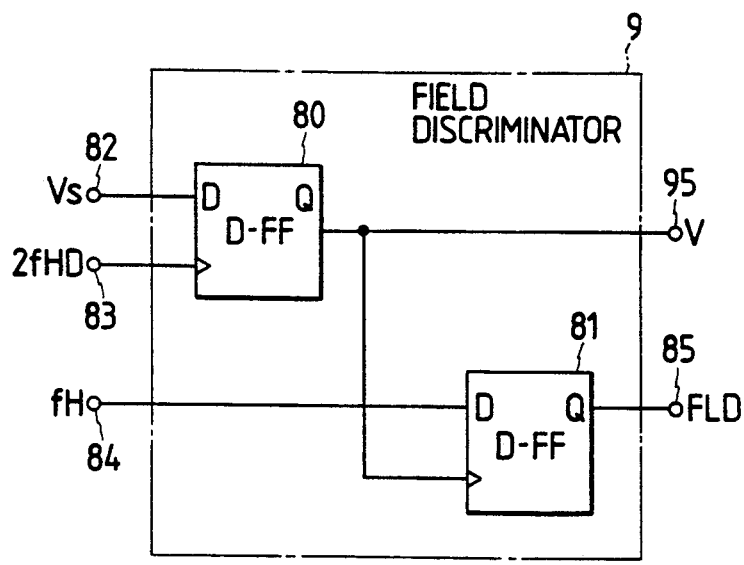
FIG. 4 and FIG. 6 are circuit diagrams showing particular examples of principal portions in FIG. 2.
Figure 5:
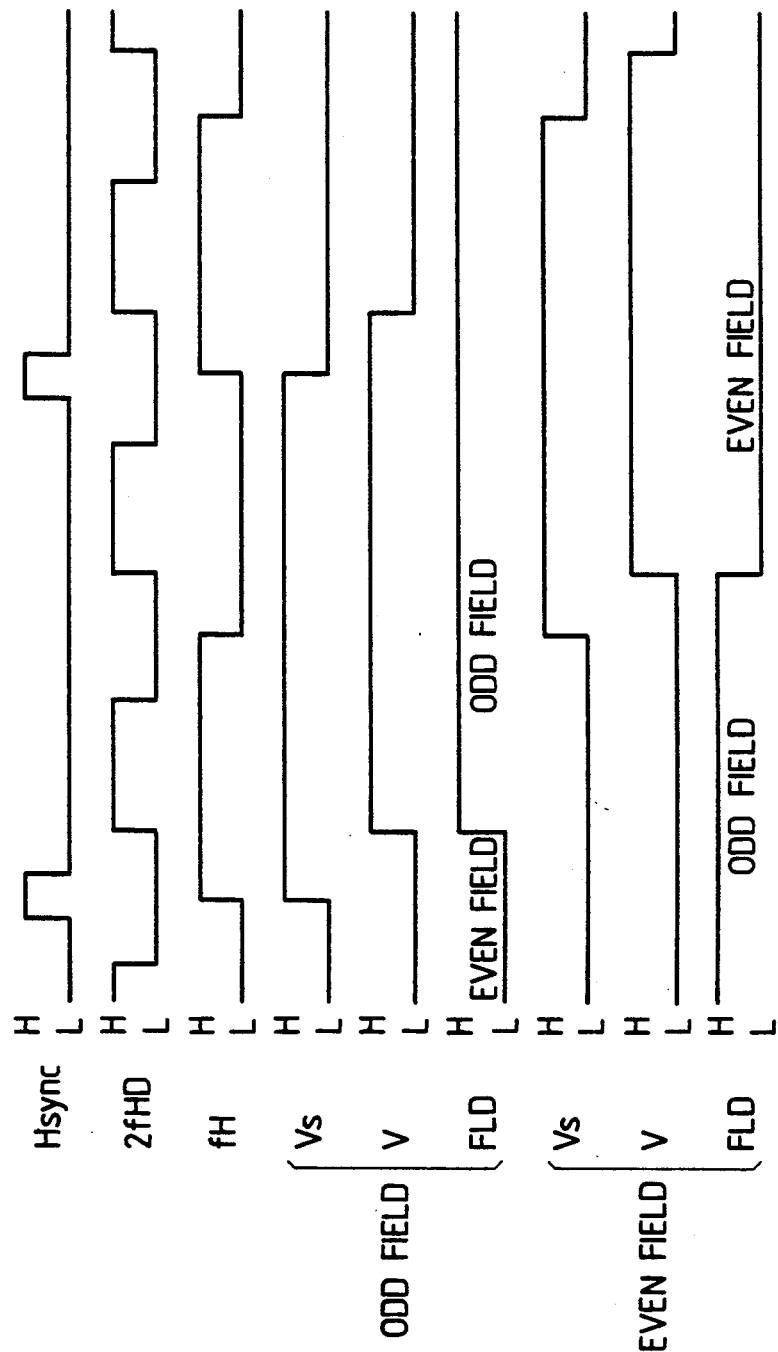
FIG. 5 and FIG. 7 are signal waveform charts in principal points in the embodiment of FIG. 2.

FIG. 4 is a diagram showing a particular circuit configuration of the field discriminator 9 and FIG. 5 is a waveform chart of principal signals for explaining FIG. 4.

As shown in FIG. 4, the field discriminator 9 comprises two D flip-flops 80 and 81. A signal Vs applied to the terminal 82 is a signal in synchronism with the vertical synchronizing signal generated by the vertical reference signal generator 20 and its pulse width is one horizontal scanning period. Signals 2fHD and fH applied to the terminals 83 and 84 are signals generated by the clock generator 8. The signal 2fHD has a period of one half the period of the horizontal synchronizing signal (hereinafter sometimes referred to as "$H_{sync}$"). The rise of the signal 2fHD is delayed from that of the signal $H_{sync}$. The signal fH is a signal in synchronism with the signal $H_{sync}$.

The signal Vs applied to the terminal 82 of the D flip-flop 80 is latched in response to the signal 2fHD applied to the terminal 83, whereby a signal V is generated and output to the terminal 95. Then, the signal fH applied to the terminal 84 of the D flip-flop 81 is latched in response to the signal V from the D flip-flop 80, whereby a field discriminating signal FLD is generated and output to the terminal 85.

As shown in FIG. 5, the timing of the rise of the signal Vs in the first field and that in the second field is different by half the horizontal scanning period. Hence, the level of the signal fH at the timing of the rise of the signal V is different between the first field and the second field. Thus, the signal FLD becomes "H" in the first field and the signal FLD becomes "L" in the second field. In this manner, the field discrimination is achieved. The signals V and FLD output to the terminals 95 and 85 are input to the interlace/non-interlace discriminator 10 of FIG. 2. At the same time, the signal FLD is input to the inverter circuit 13.

The interlace/non-interlace discriminator 10 outputs a signal discriminating between interlace and non-interlace displays based on the signals from the clock generator 8, the vertical reference signal generator 20, and the field discriminator 9. This is described below with reference to FIG. 6 and FIG. 7.

Figure 6:
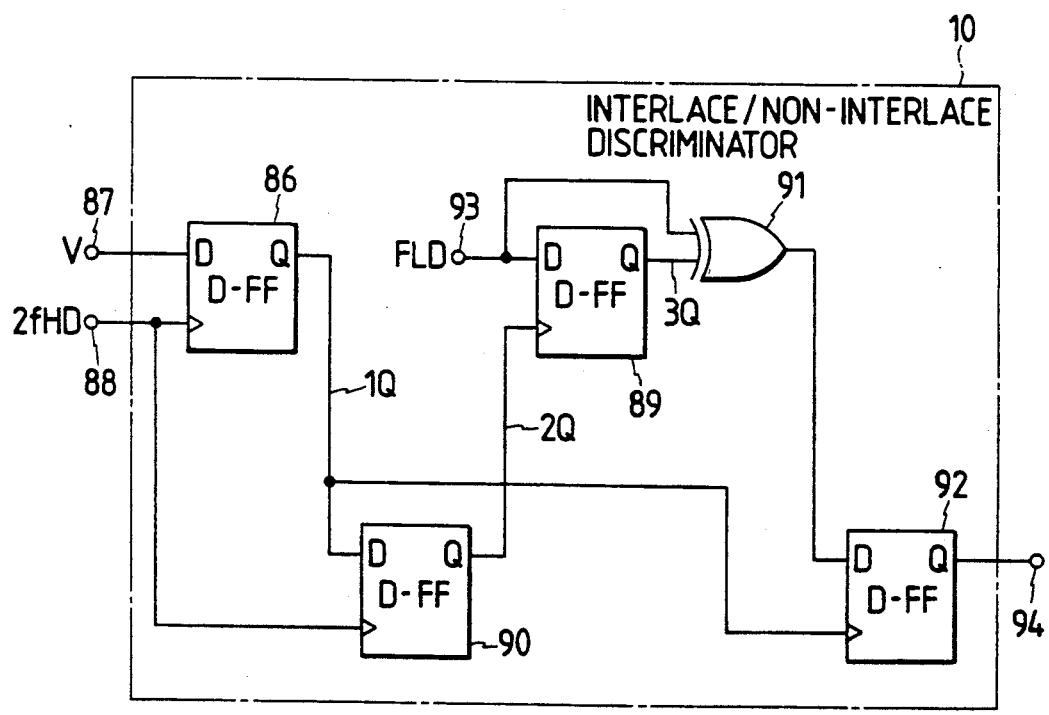

FIG. 6 is a circuit diagram showing a configuration of the interlace/non-interlace discriminator 10.

As seen from the diagram, the interlace/non-interlace discriminator 10 comprises D flip-flops 86, 89, 90, and 92 and an exclusive OR circuit 91. The input terminals 87 and 93 are respectively connected with the output terminals 95 and 85 of the field discriminator 9 and supplied with the signals V and FLD. The terminal 88 is applied with the above described signal 2fHD. The D flip-flop 86 latches the signal V applied to the terminal 87 in response to the signal 2fHD applied to the terminal 88 and generates an output signal 1Q. The signal 1Q is input to the D flip-flops 90 and 92.

The D flip-flop 90 latches the signal 1Q in response to the signal 2fHD applied to the terminal 88 and generates an output signal 2Q. This signal 2Q is latched in the D flip-flop 89 in response to the signal FLD applied to the terminal 93 and an output signal 3Q is generated. This signal 3Q is input to the exclusive OR circuit 91 together with the signal FLD applied to the terminal 93.

Figure 7:
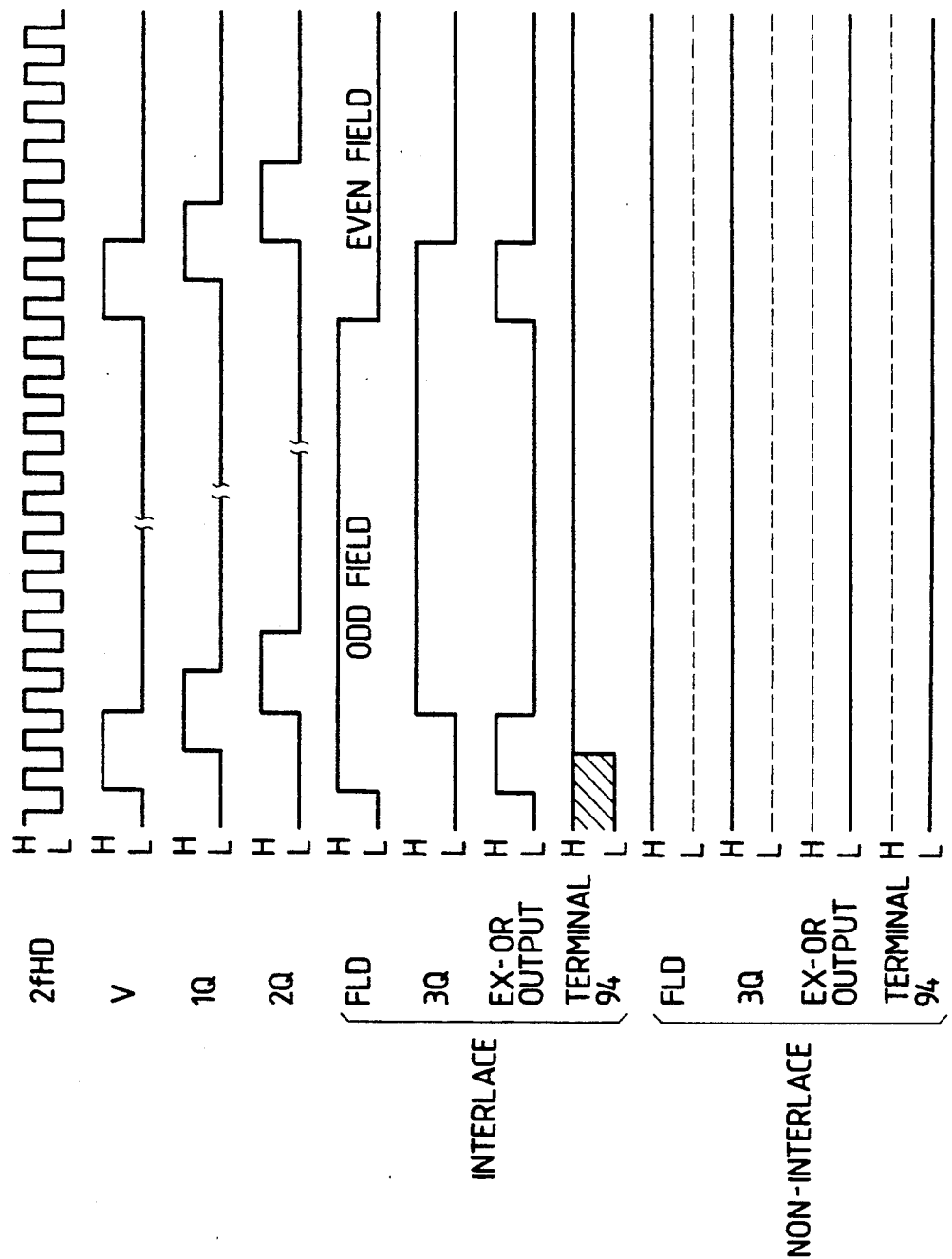

The output of the exclusive OR circuit 91 is input to the D flip-flop 92 and latched therein in response to the signal 1Q and the output signal therefrom is applied to the terminal 94. More specifically, as shown in FIG. 7, in the case of an interlace display, the field discriminating signal FLD is inverted between the first field and the second field. Hence the output of the exclusive OR circuit 91 is at "H" level at the timing of the rise of the signal 1Q. In the case of a non-interface display, the field discriminating signal FLD is no inverted between the first field and the second field. Hence the output of the exclusive OR circuit 91 is at "L" level at the timing of the rise of the signal 1Q. By using these conditions, the discrimination between interlace and non-interlace displays can be achieved.

Therefore, the interlace/non-interlace discriminator 10 (FIG. 2) outputs a discriminating signal at "H" level in the case of an interlace display and output that at "L" level in the case of an non-interlace display. This output signal becomes an input signal to the AND circuit 12 in FIG. 2.

Returning to FIG. 2, the field signal generator 11 generates two kinds of signals necessary for controlling the horizontal scanning circuit 22 in either of the cases of interlace and non-interlace displays on the basis of the signals from the clock generator 8 and the vertical reference signal generator 20 and input the generated signals to the selector switch 19.

The selector switch 19 switches the outputs of the field signal generator 11 according to the output signal of the AND circuit 12. The switch-selected signal is output to the terminal 37-1 together with the output of the signal switching circuit 21.

The field signal generator for ODD field 16 and the field signal generator for EVEN field 17 generate signals necessary for driving the horizontal scanning circuit 22 and the vertical scanning circuit 23 in the first and the second fields, respectively. The driving signals, which are generated on the basis of the signals from the clock generator 8 and the vertical reference signal generator 20, and are supplied to the signal switching circuit 21. The signal switching circuit 21 selects the signals from the signal generator for ODD field 16 and the signal generator for EVEN field 17 according to the signal from the AND circuit 14 and supplies the switch-selected signals to the terminals 37-1 and 37-2.

The output of the AND circuit 14 for controlling the signal switching circuit 21 is the logical product of the output of the inverter circuit 13 and the output of the AND circuit 12. The input to the inverter circuit 13 is the output signal FLD of the field discriminator 9. On the other hand, the input signals to the AND circuit 12 are the output signal of the interlace/non-interlace discriminator 10 and the signal applied to the input terminal 38 of the control circuit 7 from the video selecting control circuit 36.

Figure 8:
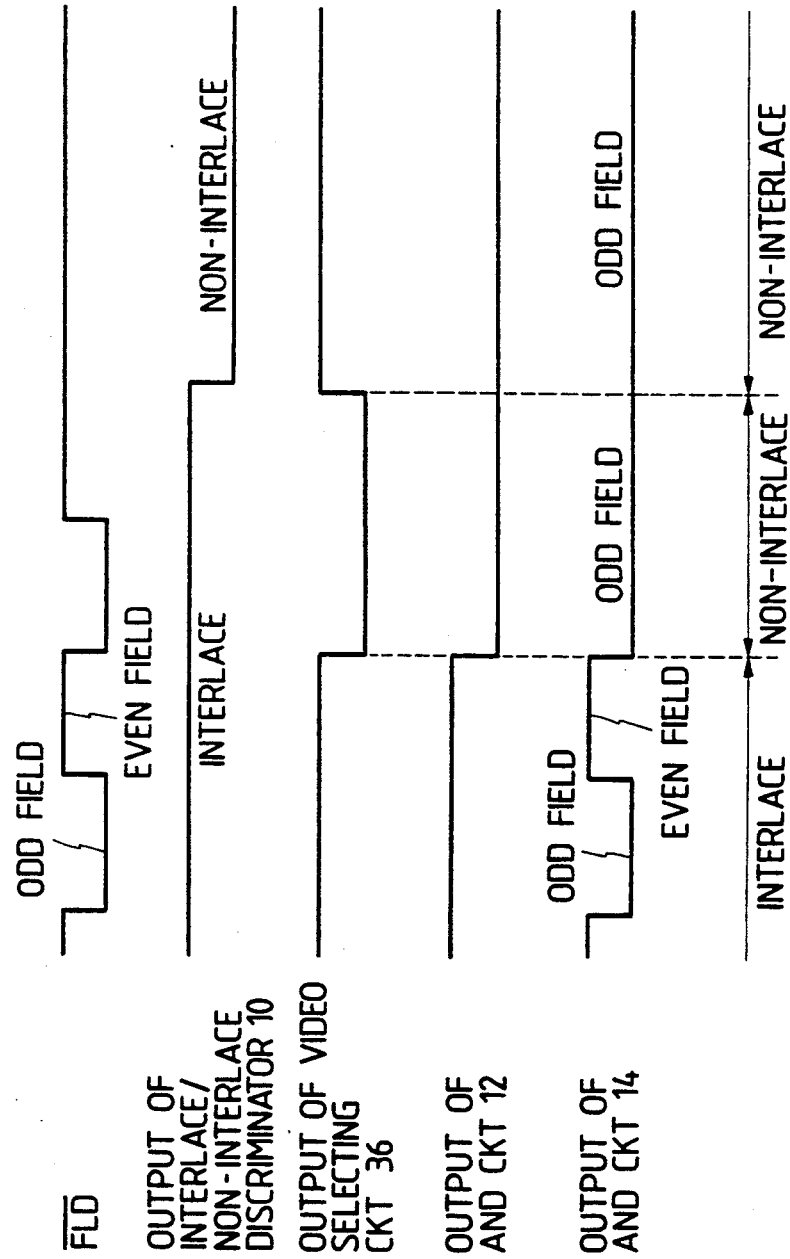
FIG. 8 is a timing chart of principal portions in FIG. 2.

The inverter circuit 13 and AND circuits 12 and 14 are for switch-selection among interlace/forced non-interlace/non-interlace displays. This will be described below with reference to FIG. 8.

Setting is first made such that the forced non-interlace display is made when the output of the video selecting control circuit 36 becomes "L" level and the interlace or non-interlace display is made when the same becomes "H" Level. In the signal switching circuit 21, the signal generator for ODD field 16 is selected when the signal input to the signal switching circuit 21 from the AND circuit 14 is at "L" level and the signal generator for EVEN field 17 is selected when the same is at "H" level.

In the case of the interlace display, the output of the video selecting control circuit 36 becomes "H" level, the output of the interlace/non-interlace discriminator 10 also becomes "H" level. Hence, the output of the AND circuit 12 becomes "H" level. Thus the inverted signal FLD of the field discriminating signal $\overline{FLD}$ is output as the output of the AND circuit 14. Accordingly, the signal switching circuit 21 selects the signal generator for ODD field 16 in the first field and selects the signal generator for EVEN field 17 in the second field and outputs corresponding signals.

In the case of the forced non-interlace display, the output of the video selecting control circuit 36 becomes "L" level and, hence, the output of the AND circuit 14 also becomes "L" level. Accordingly, the signal switching circuit 21 selects the signal generator for ODD field 16 and outputs its signals.

In the case of non-interlace display, the output of the interlace/non-interlace discriminator 10 becomes "L" level. Hence, the output of the AND circuit 14 also becomes "L" level. Accordingly, the signal switching circuit 21 selects, the same as in the case of the forcedly selected non-interlace display, the signal generator for ODD field 16 and outputs its signals.

According to the switching of the output signals for the interlace display, forcedly selected non-interlace display, and non-interlace display in the control circuit 7, the video signals are also switched by the selector switches 34 in response to the signal from the video selecting control circuit 36. More specifically, signals RGB of the TV signal and the signals $V_{sync}$ and $H_{sync}$ for the TV signal are selected in the case of the interlace display. The signals RGB from the character and graphics generator 4 and the $V_{sync}$ and $H_{sync}$ for the character and graphic signal are selected in the case of the non-interlace display. The signals RGB of the mixed signal of the TV signal and the character and graphic signal and the signals $V_{sync}$ and $H_{sync}$ for the TV signal are selected in the case of the forcedly selected non-interlace display.

When the supply of the TV signal to the input terminal 1 is stopped in the case of the forced non-interlace display, the character and graphics generator 4 and the control circuit 7 come to operate depending on their respective free-run frequency. More specifically, the character and graphics generator 4 and the control circuit 7 operate out of synchronism. Therefore, a normal display on the liquid crystal panel 33 becomes impossible not only for the video of the TV signal but also for the video from the character and graphics generator 4.

Then, the video selecting control circuit 36 in FIG. 2 detects the $H_{sync}$ and $V_{sync}$ from the synchronizing signal separator 3. When the input of the $H_{sync}$ and $V_{sync}$ are stopped in the state of forced non-interlace display as described above, the video selecting control circuit operates the selector switches 34 so as to select the signal of the character and graphics generator 4. At the same time, it applies a signal of level "H" to the input terminal 38 of the control circuit 7. Thereby, the control circuit 7 is brought into the state of the non-interlace display, and the video of the character and graphics generator 4 comes to be normally displayed on the liquid crystal panel 33.

In the horizontal scanning circuit 22, the horizontal shift register 24 operates in response to the signal output to the signal output terminal 37-1 of the control circuit 7. The sample-and-hold circuit 25 samples the output of the polarity switching circuit 6 applied to its terminal 28 and holds the data for a predetermined period.

Figure 9:
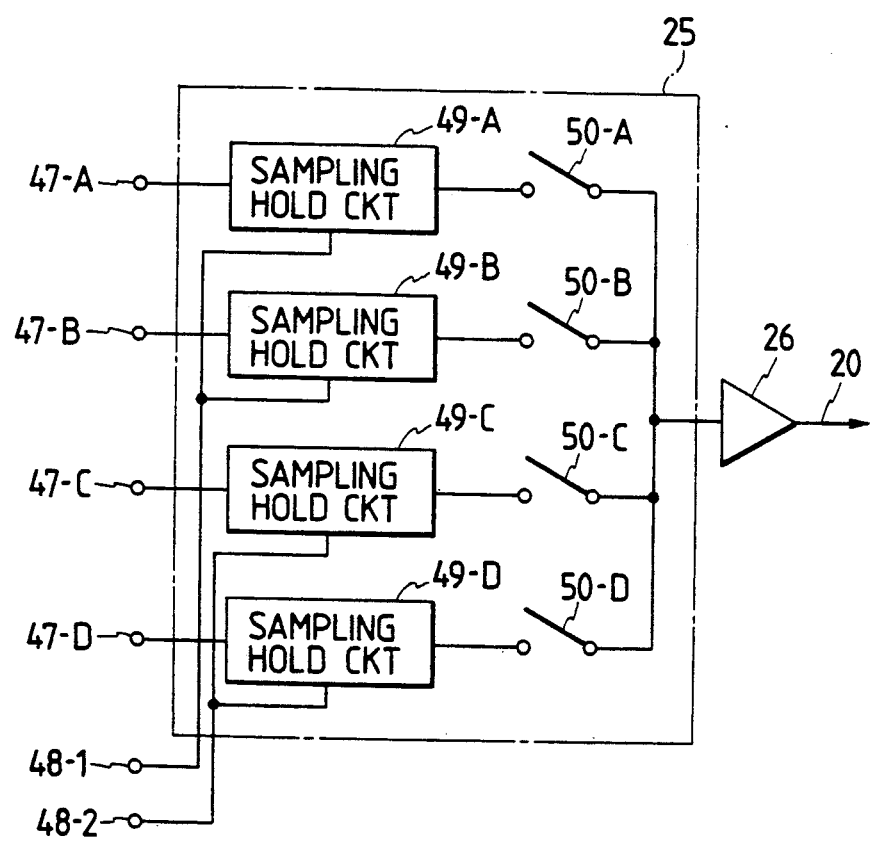
FIG. 9 is a circuit diagram showing constituents of a sample-and-hold circuit 25.

FIG. 9 schematically shows a configuration of the sample-and-hold circuit for one step of the buffer 26. The circuit comprises sample signal input terminals 47, sample-and-hold circuits 49, clock input terminals 48, and output switches 50 for four series.

In the double line sequential scanning system, writing of two lines on the liquid crystal panel 33 is performed in one horizontal scanning period. Therefore, signals $R_X$ and $R_Y$ for one horizontal scanning period output from the polarity switching circuits 6, for example, are sampled and held by the sample-and-hold circuits 49-A and 49-B. The switch 50-A is closed in the first half of the next horizontal scanning period so that the signal in the sample-and-hold circuit 49-A is output. The switch 50-A is opened and the switch 50-B is closed in the second half of the same horizontal scanning period so that the signal in the sample-and-hold circuit 49-B is output.

While the signals of the sample-and-hold circuits 49-A and 49-B are output, newly input horizontal scanning signals are sampled and held by the sample-and-hold circuit 49-C and 49-D and then these are output as described.

The signal thus output from the sample-and-hold circuit 25 becomes input signal to the output buffer 26. The output of the output buffer 26 is applied to the scanning electrodes 20-1, . . . of the liquid crystal panel 33 in accordance with an OE signal applied to the control terminal 29 in FIG. 2. The timing of the OE signal is ½ horizontal scanning period.

Meanwhile, in the vertical scanning circuit 23 formed of a shift register selects one of the 480 pieces of scanning electrodes 32 on the liquid crystal panel in accordance with the signal from the control circuit 7 for each ½ horizontal scanning period. That is, two vertical scanning electrodes 32 are selected in one horizontal scanning period.

Then, if the scanning electrode 32-i for the ith line is driven, the transistors (30-i, 1) to (30-i, 720) whose gates are in connection with that electrode are turned on simultaneously. At this time, the image signals sampled and held by the sample-and-hold circuit 25 are output in synchronism with the signal OE with a period corresponding to ½ horizontal scanning period applied to the control terminal 29 of the output buffers (26-1) to (26-720) are output. Thereby, the sampled-and-held image signals are written into the liquid crystal pixels (31-i, 1) to (31-i, 720) through the pixel transistors (30-i, 1) to (30-i, 720) which are in the on state. Thus, writing of the image information for the ith line of the liquid crystal panel 33 is carried out.

Now the operations for achieving the interlace display, non-interlace display, and forced non-interlace display will be described below in detail referring to FIG. 10, FIG. 11, and FIG. 12 in which waveforms of principal signals in the embodiment of FIG. 2 in operation are shown.

First, in the case of the interlace display, the signal generator for ODD field 16 (FIG. 2) is selected by the signal switching circuit 21 in the first field and corresponding signals are output therefrom. FIG. 10 shows principal waveforms provided when the output of the signal generator for ODD field 16 is selected by the signal switching circuit 21.

Figure 10:
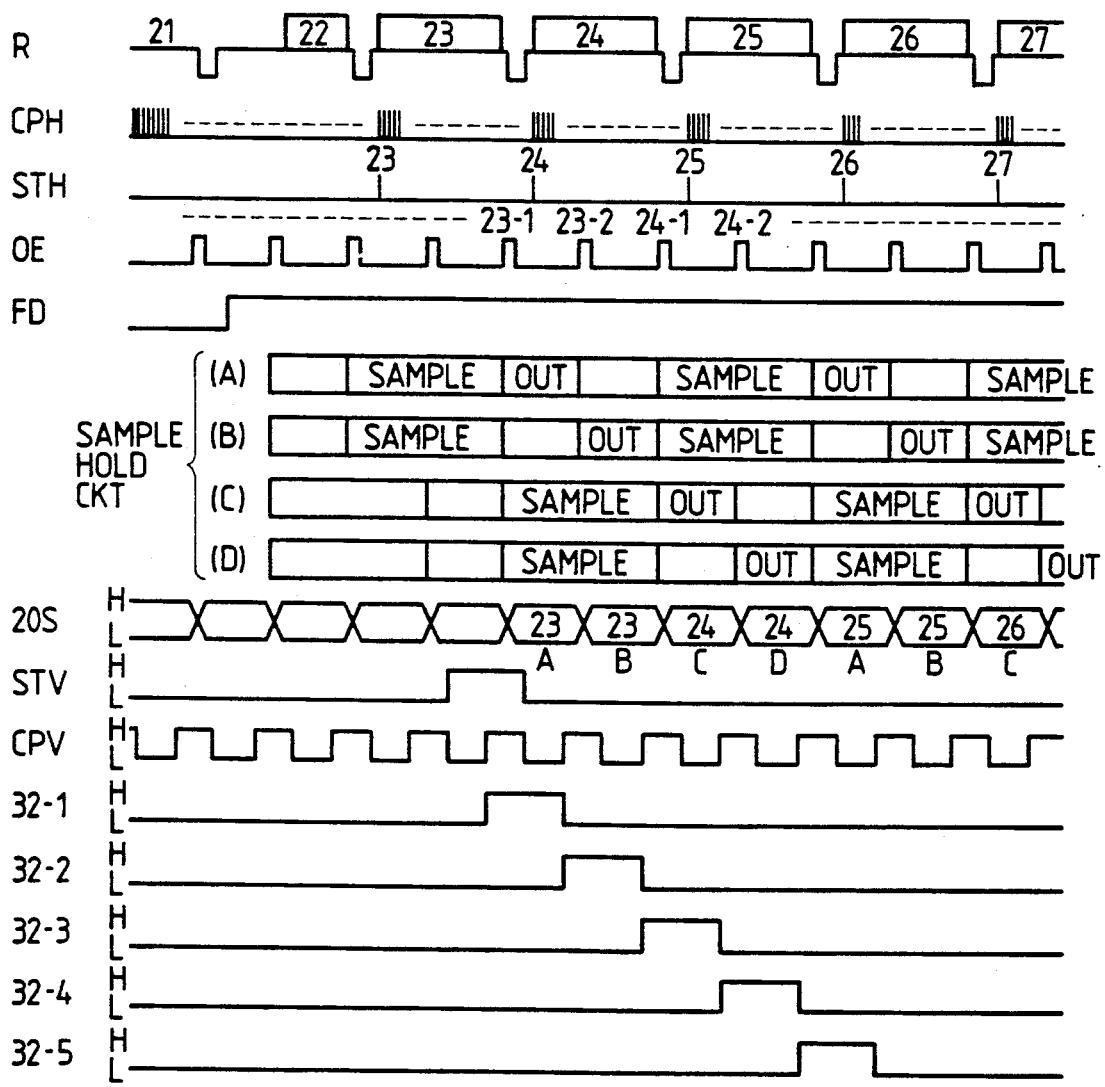
FIG. 10 is a waveform chart of principal signals in the ODD field in the embodiment of FIG. 2.

In FIG. 10, R denotes a video signal, CPH and STH denote the clock and the sampling starting signal for the horizontal shift register 24, OE denotes the output control signal for the buffers 26, FD denotes a field signal, and CPV and STV denote the clock and the scanning starting signal for the vertical scanning circuit.23. Further, operating conditions of the sample-and-hold circuits (A), (B), (C) and (D) show the operating conditions of the sample-and-hold circuits A, B, C, and D of FIG. 9.

The number attached to each pulse in FIG. 10 is related to the horizontal scanning cycle of the video signal.

The operations is now described. The video signal of the horizontal scanning line number 23H is sampled and held by the sample-and-hold circuits 49-A and 49-B with the pulse 23T of the signal STH used as the starting pulse in response to the clock pulse CPH. In the first half of the next horizontal scanning period, the signal in the sample-and-hold circuit 49-A is output in response to the pulse 23-1 of the signal OE. In the second half, the signal in the sample-and-hold circuit 49-B is output in response to the pulse 23-2 of the signal OE.

Figure 13:
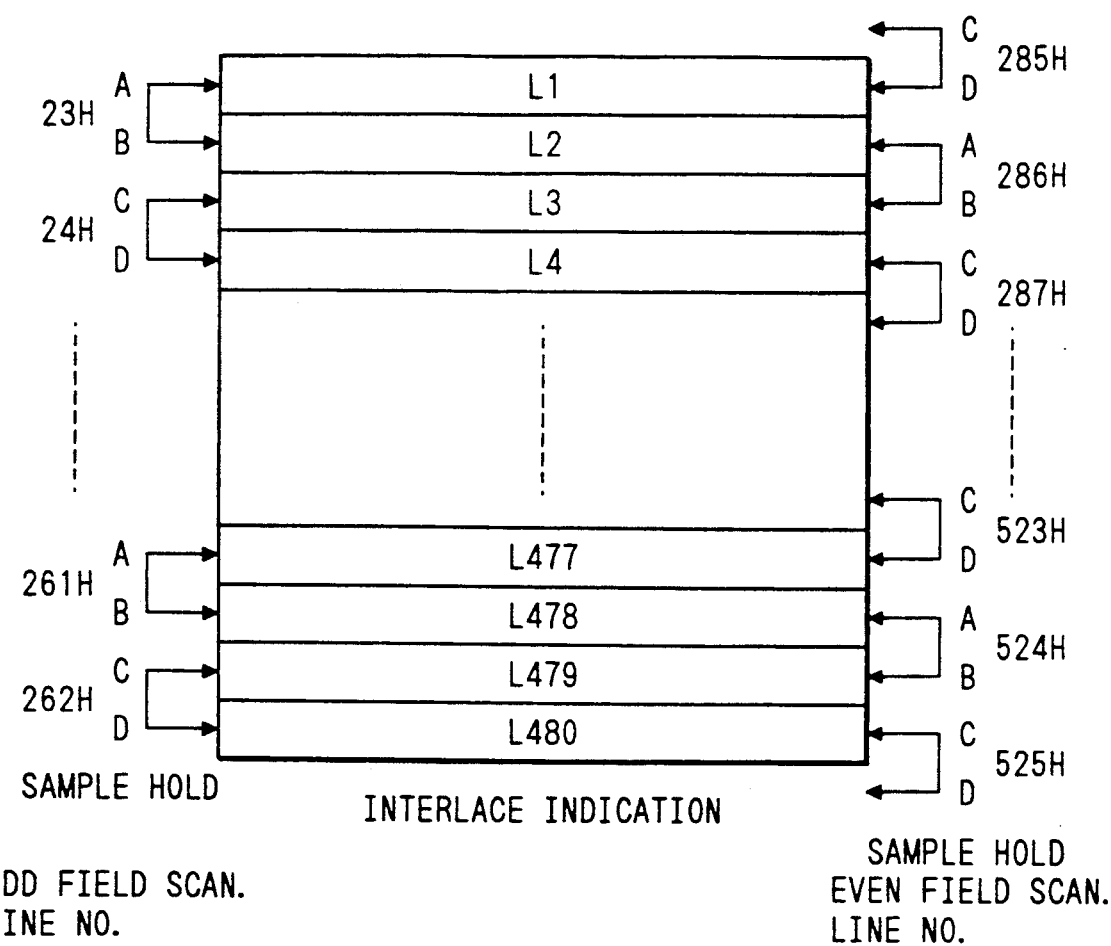
FIG. 13 and FIG. 14 are explanatory drawings of the relationship between the panel line numbers and the scanning line numbers.

The signals STV and CPV as shown in FIG. 10 are input to the vertical scanning circuit 23. As a result, the gate electrodes 32/1, 32/2, ... are sequentially selected. Thus, the signals of the horizontal scanning line number 23 are written in the first and second lines of the liquid crystal panel 33. Likewise, the signals of the horizontal scanning line number 24 are written in the third and fourth lines. The relationship between the panel line numbers and the scanning line numbers of the displayed image signal is shown in FIG. 13.

Thus, in the first field, the signal of the horizontal scanning line number 23H is written in the first and second lines. The signal of the horizontal scanning line number 24H is written in the third and fourth lines.

In the case of the interlace display, the output of the signal generator for EVEN field 17 is selected by the signal switching circuit 21 in the second field. Principal waveforms provided at this time are shown in FIG. 11. The names of the illustrated signals are the same as those in FIG. 10 and, hence, description thereof will be omitted.

Figure 11:
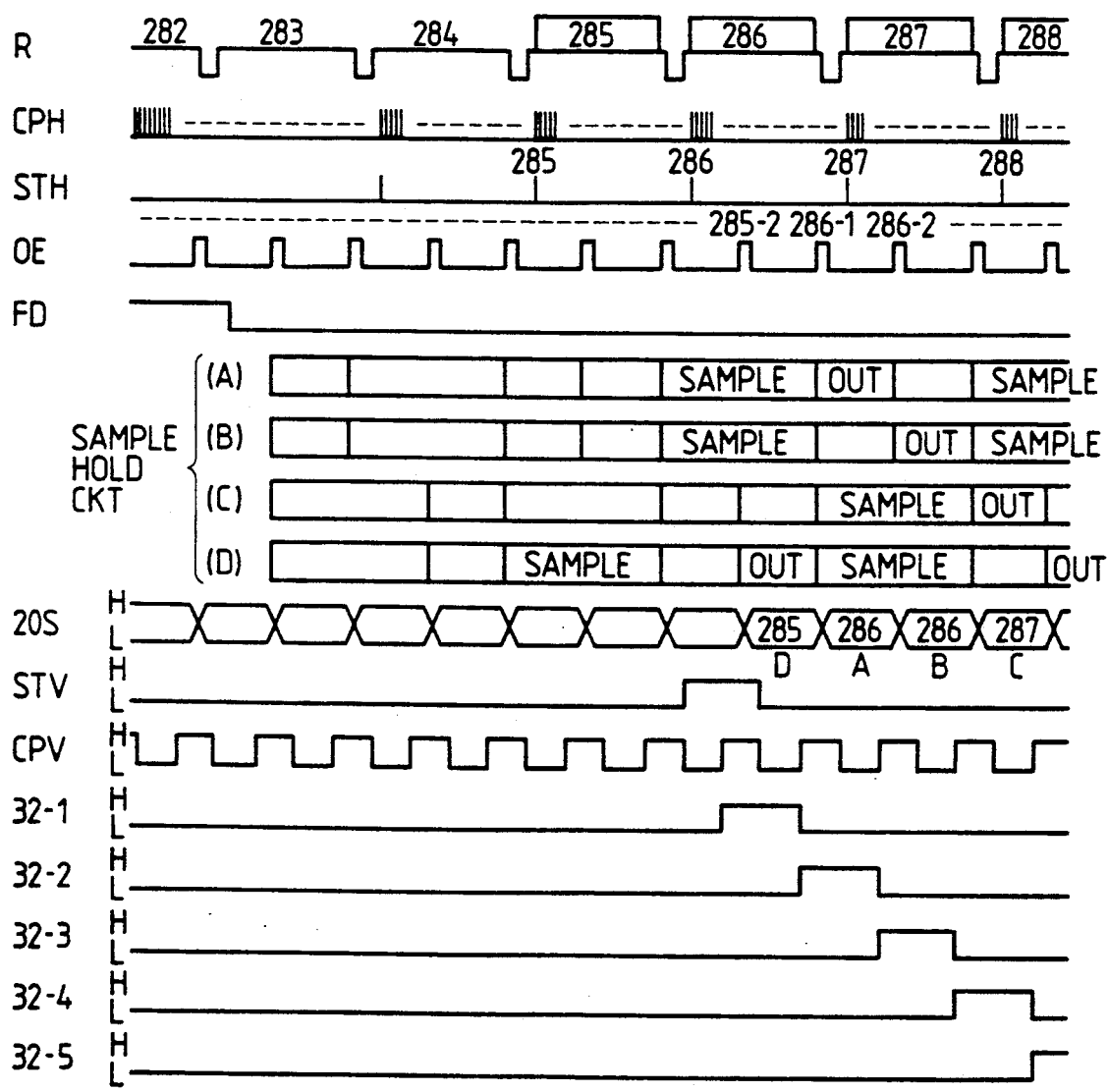
FIG. 11 is a waveform chart of principal signals in the EVEN field at the interlace scanning in the embodiment of FIG. 2.
Figure 12:
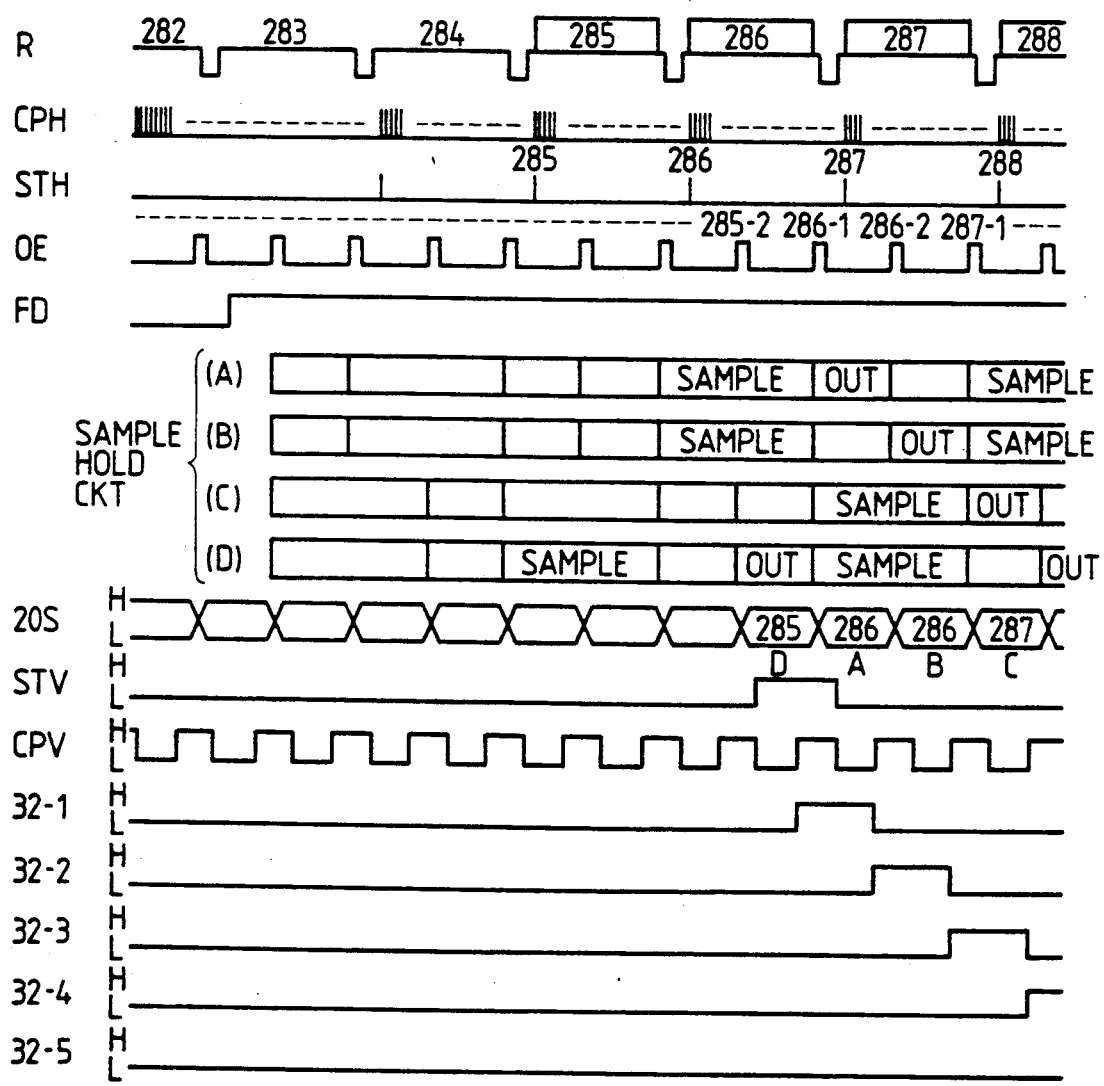
FIG. 12 is a waveform chart of principal signals in the EVEN field at the forced non-interlace scanning in the embodiment of FIG. 2.

As seen from FIG. 11, the scanning starting signal STV of the vertical scanning circuit 23 is set so that the signal of the horizontal scanning line number 285H for the signal electrode 20S may be output in the second half of one horizontal scanning period when the gate electrode 32-1 is selected.

The relationship between the panel line numbers and the scanning line numbers of the displayed image signal is shown in FIG. 13. The combination of the adjoining two panel lines in which signals of the same scanning line number are written in the ODD field and those in the EVEN field are shifted. For example, when the signals of the scanning line number 24H are written in the panel line numbers L3 and L4 in the first field, the signals of the scanning line number 286H are written in the panel line numbers L2 and L3 in the second field. This is the scanning condition in the above described double line sequential scanning system for the interlace display.

Now, the operation for the non-interlace display is now described. In this case, only the signals of the signal generator for ODD field 16 are selected and output by the signal switching circuit 21. That is, the waveforms shown in FIG. 10 are repeated for all fields. Since detailed description thereof has already been given, it will be omitted here.

Figure 14:
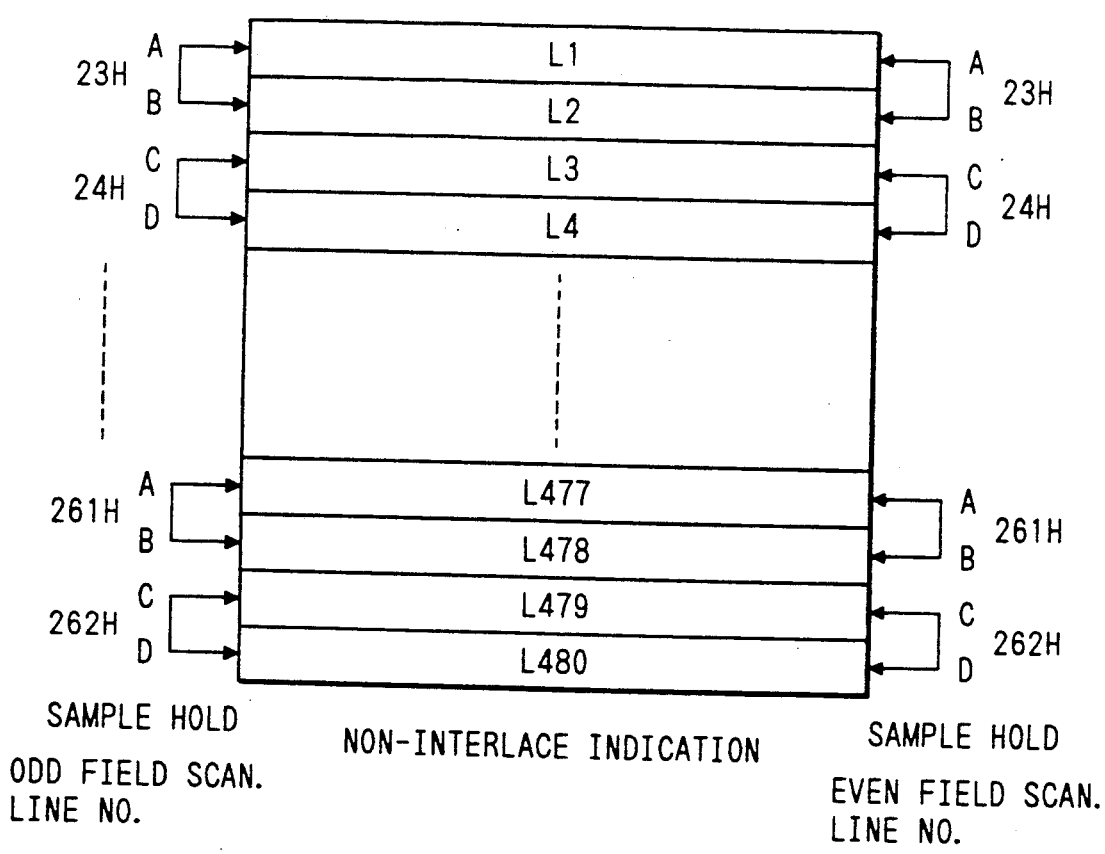

Consequently, the relationship between the panel line numbers and the scanning line numbers becomes as shown in FIG. 14. That is, the same panel line numbers are driven by the signals of the same scanning line number both in the ODD field and the EVEN field.

Lastly, the forced non-interlace display operation will be described. FIG. 12 is a waveform chart of principal signals for describing the operation. The waveforms are the same as those in FIG. 11 except the timing of the scanning starting signal STV of the vertical scanning circuit 23 and the timing of the signals of the gate electrodes 32-1, . . . .

As described above, in the case of the forced non-interlace display, the signal switching circuit 21, the same as in the case of the non-interlace display, selects and outputs only the signal from the signal generator circuit for ODD field 16.

In the case of the forced non-interlace display, the horizontal and vertical synchronizing signals are those from the TV signal. When the signal generator for ODD field 16 is selected in the second field, the waveforms then provided become as shown in FIG. 12, in which the timing of the signal STV is shifted by 0.5H from the case of FIG. 11 where the signal generator for EVEN field 17 is selected in the second field. That is, the selected combinations of the adjoining two lines in the first field and the second field are different.

The relationship between the panel line numbers and the scanning line numbers of the displayed image signal is shown in FIG. 13, which was mentioned in the previous case. The adjoining two panel lines in which signals are written by the same scanning signal in the first field. Those in the second field are of the same combination. For example, when the signals of the scanning line number 23H are written in the panel line numbers L1 and L2 in the first field, the signals of the scanning line number 286H are also written in the panel line numbers L1 and L2 in the second field. That is, the TV signal which should originally be interlace-displayed is now non-interlace-displayed by force.

As described in the foregoing, it is possible to have a TV signal interlace-displayed with importance placed on the resolution and have a character and graphic signal non-interlace-displayed from the viewpoint of preventing sticking.

In addition, by having a signal obtained by superimposing a character and graphic signal on a TV signal displayed in the forced non-interlace scanning system, it has become possible to achieve superimposing without causing sticking. The TV signal display, the character and graphic signal display, and the superimposed display are, of course, selected by switching.

Figure 15:
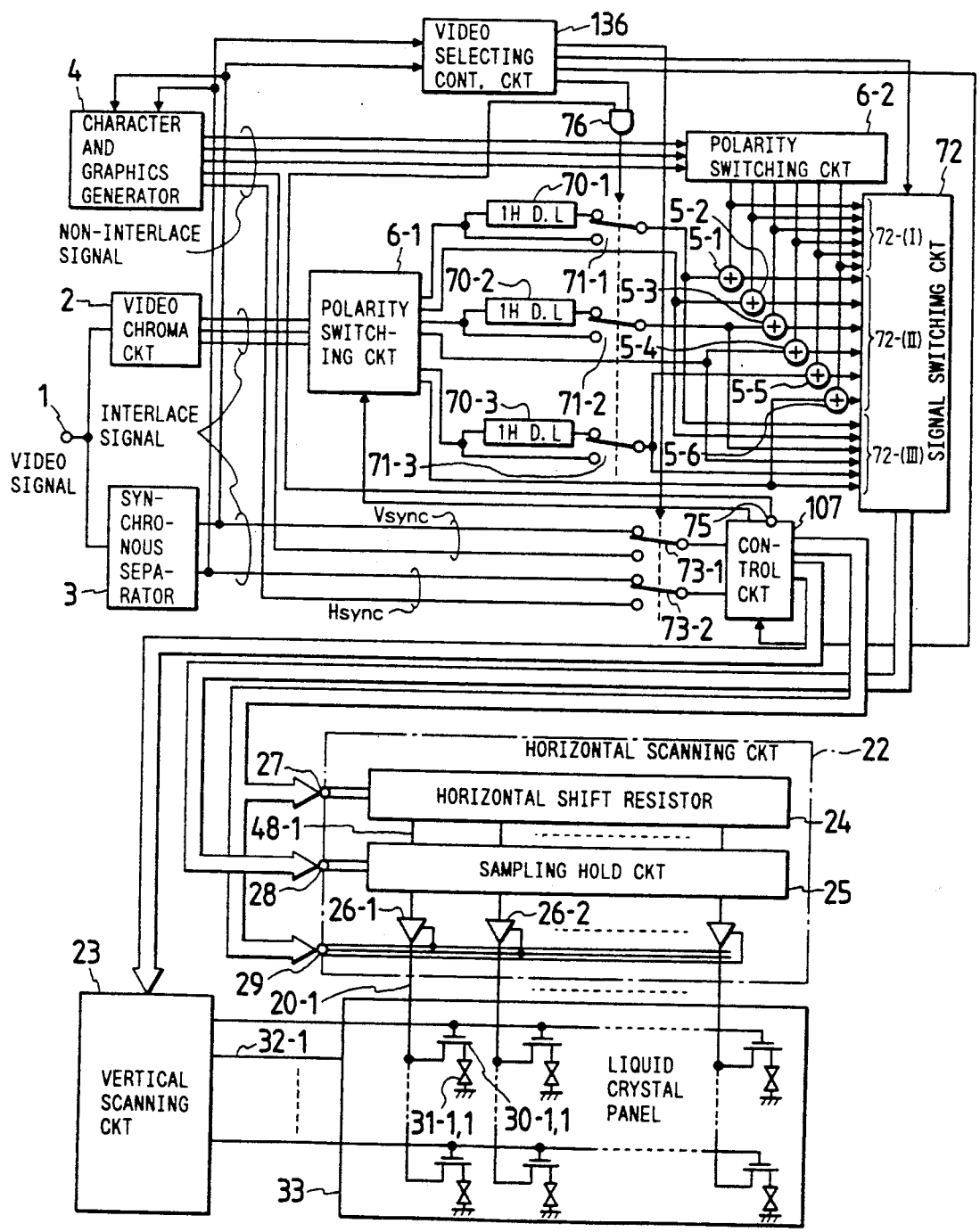
FIG. 15 is a block diagram of a liquid crystal display apparatus as another embodiment of the present invention.

FIG. 15 shows a second embodiment of the present invention. The point in which the present embodiment greatly differs from the embodiment shown in FIG. 2 is that signals are obtained by switching the polarity of the primary signals RGB from the video chroma circuit 2 in the polarity switching circuit 6-1. The output signals passed therefrom through 1HD.L (1H delay) circuits 70 are added to signals obtained by switching the polarity of the primary signals RGB from the character and graphics generator 4 in the polarity switching circuit 6-2.

By so doing, superimposed display can be achieved without deteriorating the vertical resolution of the interlace video signal (TV signal).

The control circuit 107 is of the configuration obtained by providing the control circuit 7 in FIG. 2 with an output terminal 75 of the AND circuit 14. The AND circuit 76 in FIG. 15 controls the selector switches 71 depending on the signal from the terminal 75 and an output signal of the video selecting control circuit 136. The polarity switching circuit 6-1 and 6-2 are of the same configuration as that shown in FIG. 3.

When operating the circuit of FIG. 15, the polarity of the primary signals RGB from the video chroma circuit 2 is switched in the polarity switching circuit 6-1. The output signal $R_X$, $G_X$, and $B_X$ of the output signals from the polarity switching circuit 6-1 are input to the 1HD.L circuits 70-1, 70-2, and 70-3 and also applied to the selector switches 71-1, 71-2, and 71-3. The output signals $R_Y$, $G_Y$, and $B_Y$ are input to adders 5-2, 5-4, and 5-6 and also input to the signal switching circuit 72.

The selector switch 71-1 selects either the output of the 1HD.L circuit 70, i.e., the signal obtained by delaying the signal $R_X$ by 1H, or the signal $R_X$, and inputs the selected one signal to the analog adder 5-1 and also to the signal switching circuit 72. The selector switches 71-2 an 71-3 perform similar operations to that performed on the signal $R_X$ on the signals $G_X$ and $B_X$ and input these signals to the analog adders 5-3 and 5-5 and also to the signal switching circuit 72.

On the other hand, the primary signals RGB generated in the character and graphics generator 4 are switched for polarity in the polarity switching circuit 6-2. The output signal $R_X$ of the polarity switching circuit 6-2 is input to the analog adder 5-1. Similarly, the output signals $R_Y$, $G_X$, $G_Y$, $B_X$, and $B_Y$ are input to the analog adders 5-2, 5-3, 5-4, 5-5, and 5-6, respectively. These signals are also input to the signal switching circuit 72. The outputs of the analog adders 5-1 to 5-6 are input to the signal switching circuit 72.

As described above, the signal switching circuit 72 is supplied with three series of signals (indicated by 72-(I), 72-(II), and 72-(III) in FIG. 15), that is, the signals based on the TV signal input to the input terminal 1, the signals based on the outputs of the character and graphics generator 4, and the signals obtained by adding these signals together.

The switching circuit 72 selects and outputs one series of the above described three series of signals in accordance with a control signal from the video selecting control circuit 136.

Figure 16:
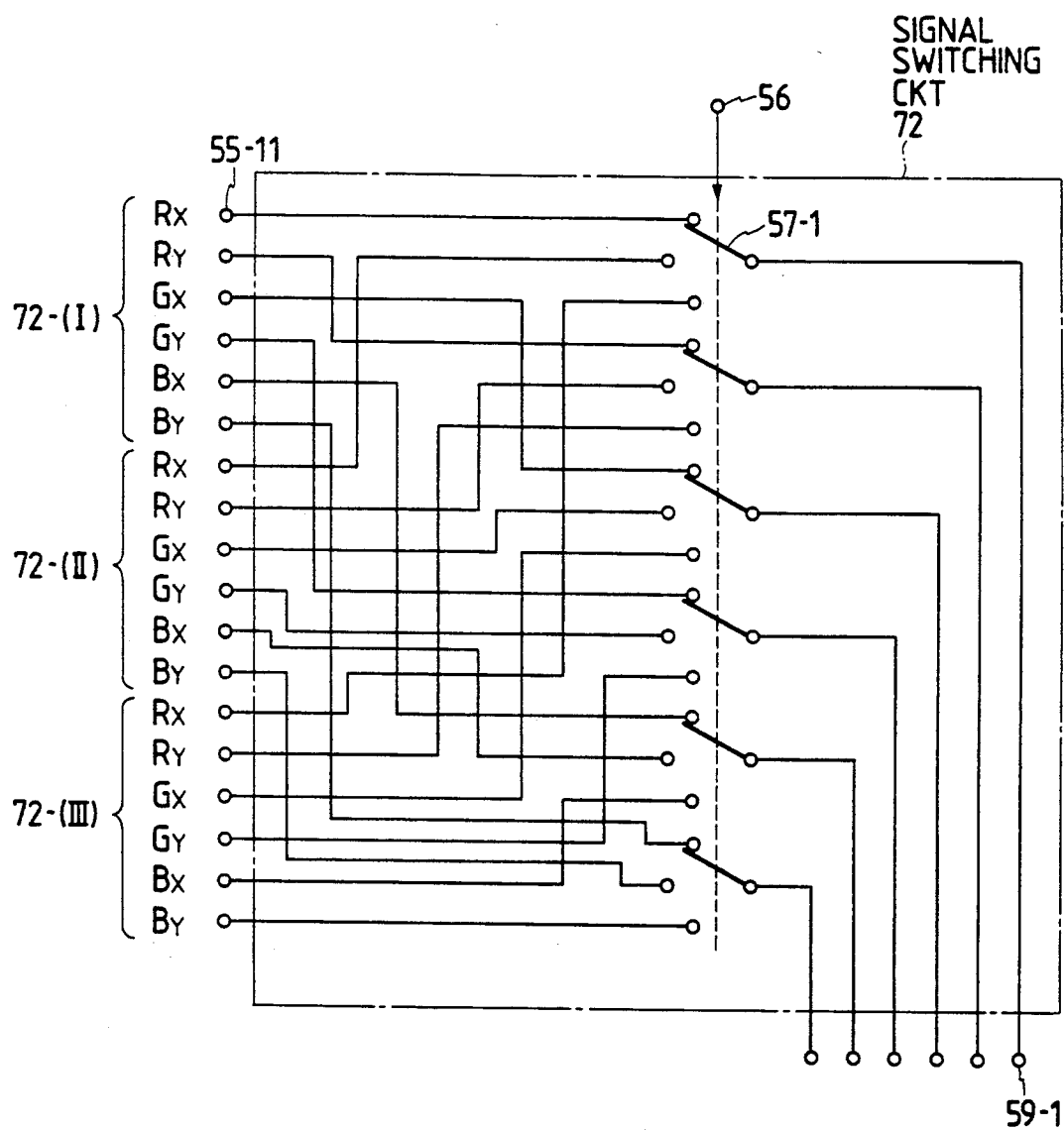
FIG. 16 is a diagram showing a particular configuration of a signal selecting circuit 72.

The signal switching circuit 72 is adapted, as shown in FIG. 16, to have the video signals input to the terminals 55 switched by the switches 57 according to the signal of the video selecting control circuit 136 so that the desired series of signals are output to the switched signal outputs 59.

The above output signals are supplied to the terminal 28 of the sample-and-hold circuit 25 of the horizontal scanning circuit 22.

In the circuit of FIG. 15, when the information from the character and graphics generator 4 is to be displayed, i.e., when a non-interlace display is to be performed, selector switches 73-1 and 73-2 select the $V_{sync}$ and $H_{sync}$ of the character and graphics generator 4 in accordance with a signal from the video selecting control circuit 136. The selector switches 71-1, 71-2, and 71-3 are set, in accordance with the output signals of the video selecting control circuit 136 and the control circuit 107, to the side outputting the signals $R_X$, $G_X$, and $B_X$ as they are (not passed through the 1HD.L circuits 70). The signal switching circuit 72 selects and outputs the signals of the series 72-(1) from the character and graphics generator 4 out of the three series of signals. Meanwhile, the video selecting control circuit 136, the same as in the first embodiment, arranges the control circuit 107 so that driving conditions to perform the non-interlace display are set up. Thus, the non-interlace display the same as in the first embodiment can be performed.

When the video signal input to the input terminal 1 is to be displayed, i.e., when the interlace display is to be performed, the selector switches 73-1 and 73-2 select the $V_{sync}$ and $H_{sync}$ from the synchronizing signal separator 3 in accordance with the signal from the video selecting control circuit 136. The selector switches 71 are held in the state of making the non-interlace displaying as described above in accordance with the output signals from the video selecting control circuit 136. The terminal 75, and the signal switching circuit 72 selects and outputs the signals of the series 72-(III) from the video chroma circuit 2 out of the three series of input signals. Thus, the interlace display the same as in the first embodiment, can be achieved.

When the superimposed display is to be performed, the signal switching circuit 72 selects and outputs the output signal series 72-(II) of the analog adders 5 (generic name of the adders 5-1 to 5-5) out of the three series of input signals, with the selector switches 73-1 and 73-2 held in the interlace display state in accordance with the signal from the video selecting control circuit 136. Thus, the forced non-interlace display, i.e., the superimposed display, the same as in the embodiment of FIG. 2 can be achieved.

Further, with the setting for the above described forced non-interlace display kept as it is, by having the selector switches 71-1, 71-2, and 71-3 controlled depending on the signals from the video selecting control circuit 136 and the output terminal 75 of the control circuit 107. In this manner, the output signals of the 1HD.L circuits 70-1, 70-2, and 70-3 are selected in the second field, a superimposed display without deteriorating the vertical resolution of the TV signal input from the input terminal 1 can be achieved.

Figure 18:
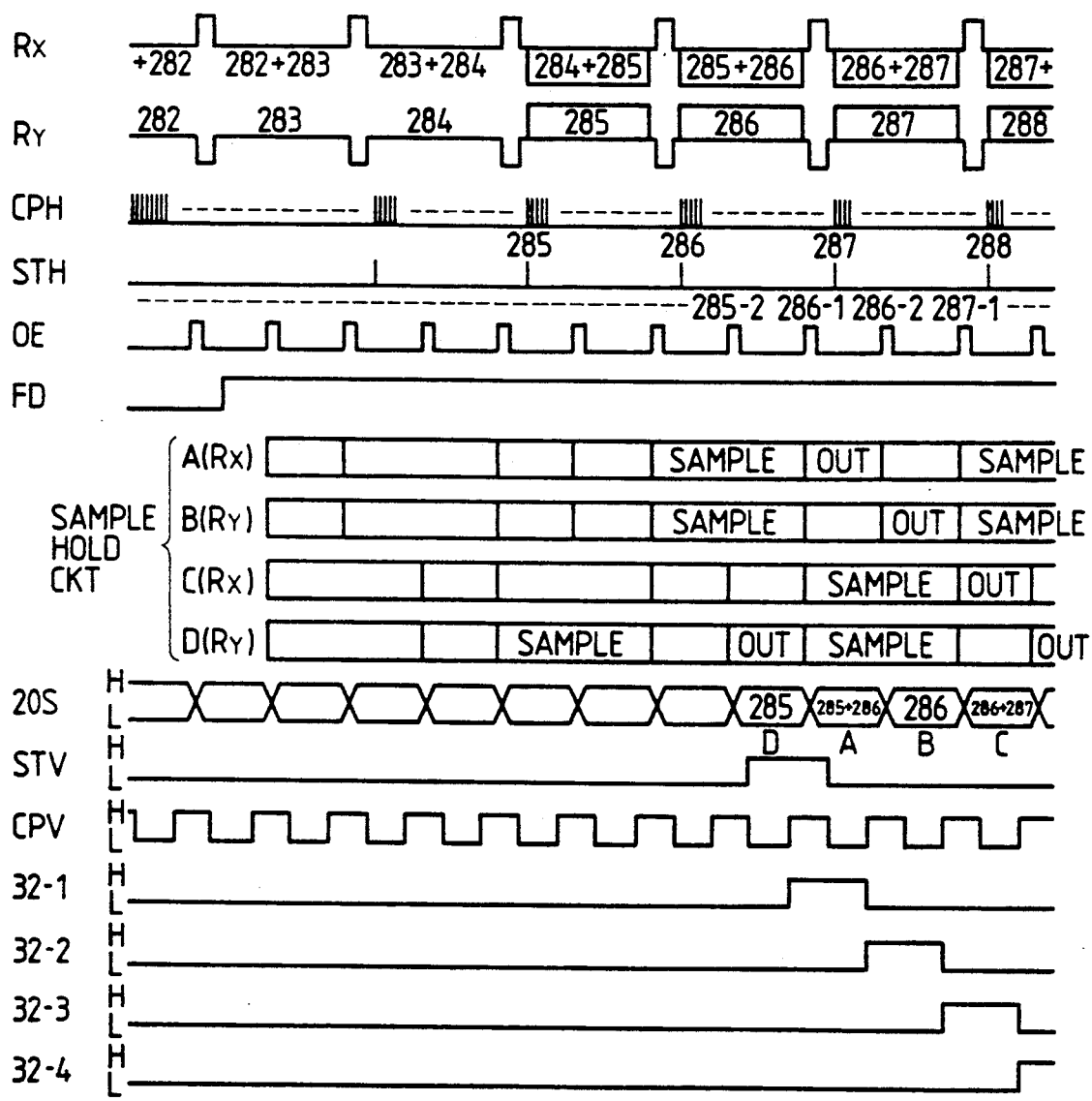
Figure 19:
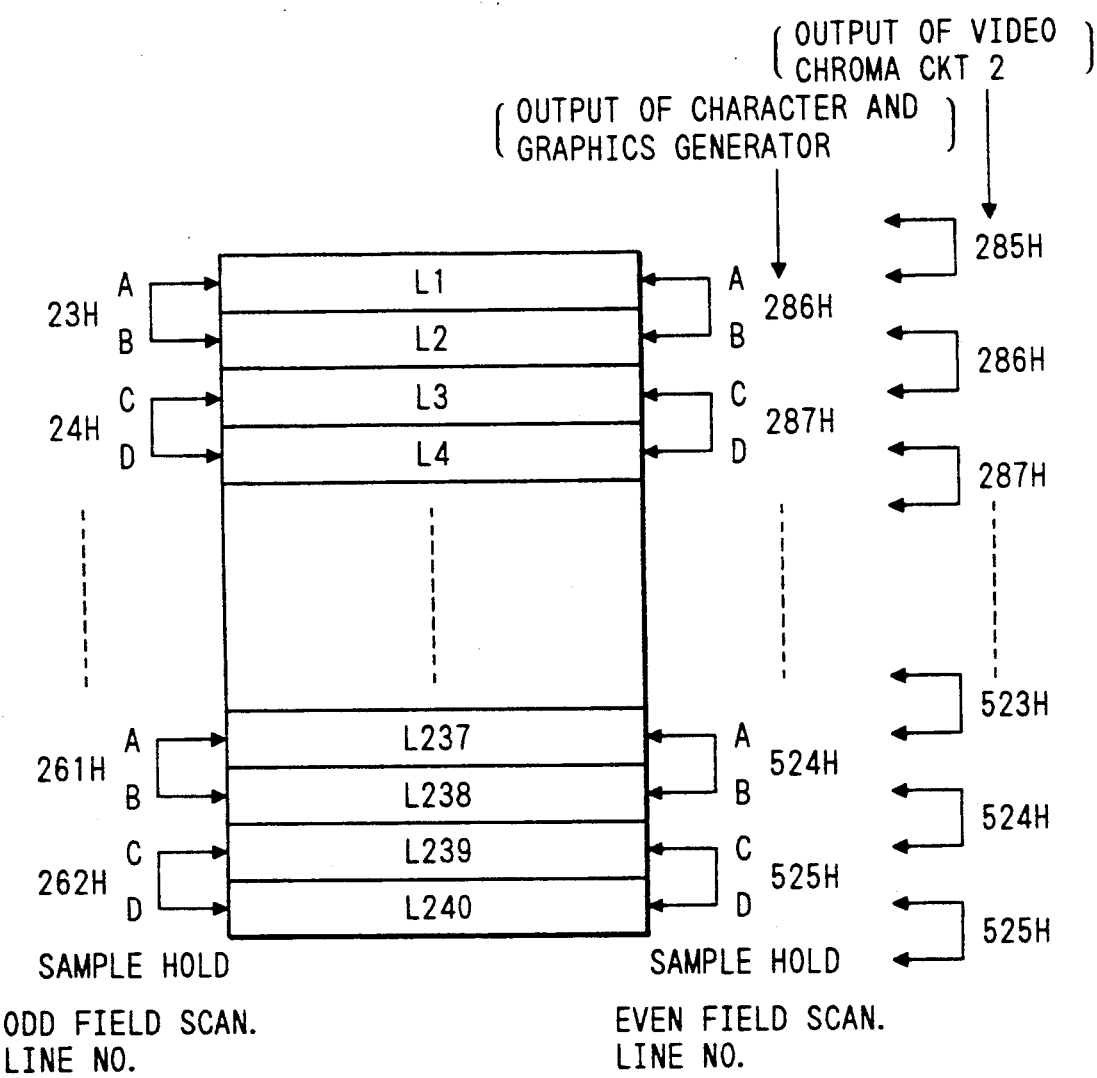
FIG. 19 is an explanatory drawing of the relationship between the liquid crystal panel line numbers and the scanning line numbers in the embodiment of FIG. 15.

The above mentioned operation will be described below referring to waveform charts of principal signals of FIG. 17 and FIG. 18 and the diagram, FIG. 19, showing the relationship between the liquid crystal panel line numbers and the scanning line numbers.

Figure 17:
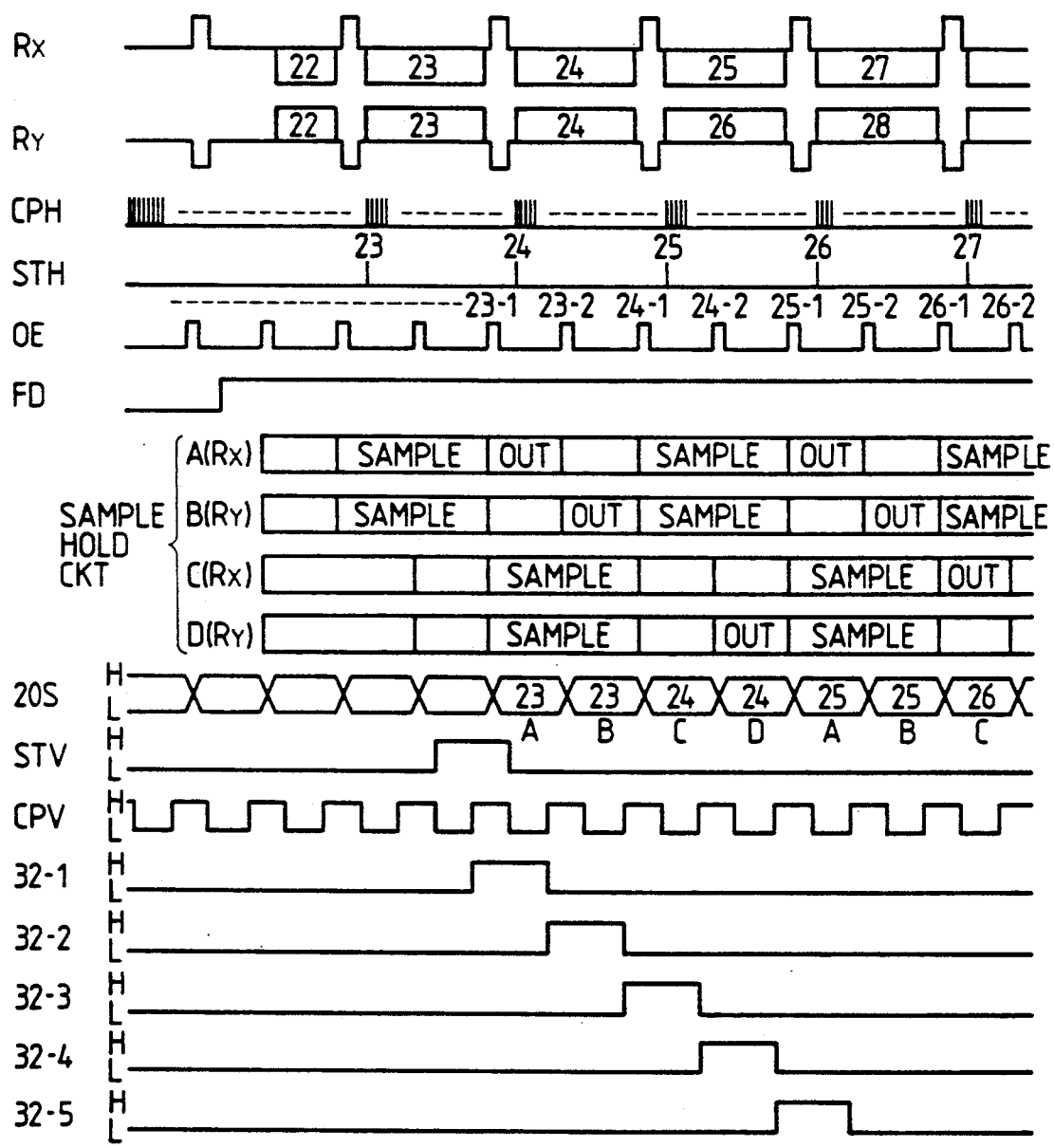
FIG. 17 and FIG. 18 are waveform charts of principal signals in the ODD field and EVEN field in the embodiment of FIG. 15.

FIG. 17 is a waveform chart of principal signals in the first field. $R_X$ and $R_Y$ are, for example, the outputs of the adders 5-1 and 5-2. Since the output of the 1HD.L circuit 70-1 is not selected in the first field, there is no difference in timing between the scanning lines corresponding to the outputs $R_X$ and $R_Y$. The output $R_X$ is sampled and held by the sample-and-hold circuits A and C and the output $R_Y$ is sampled and held by the sample-and-hold circuits B and D. At this time, the output of the signal electrode 20S is written, as shown in FIG. 19. The signals of the scanning line number 23H are written in the first and second lines of the liquid crystal panel. The signals of the scanning line number 24H are written in the third and fourth lines of the liquid crystal panel.

By contrast, the output of the 1HD.L circuit 70-1 is selected in the second field. Only the signal of the video chroma circuit 2, in the output of the analog adder 5-1, is delayed by 1H. Therefore, as shown in FIG. 18, the signals of which only the signals of the video chroma circuit 2, i.e., the TV signals, are delayed by 1H for the gate electrodes 32-1, 32-3, 32-5, . . . are output to the signal electrode 20.

As a result, as shown in FIG. 19, the signal of the output scanning line number 286 of the character and graphics generator 4 and the signal of the output scanning line number 285 of the video chroma circuit 2 are written in the first line of the liquid crystal panel. The signal of the output scanning line number 286 of the character and graphics generator 4 and the signal of the output scanning line number 286 of the video chroma circuit 2 are written in the second line of the liquid crystal panel. This means that the output of the character and graphics generator 4 and the output of the video chroma circuit 2 are simultaneously displayed, with the former displayed in the non-interlace system and the latter in the interlace system. A superimposed display can be achieved without deteriorating the vertical resolution of the TV signal input to the input terminal 1 not so much as in the first embodiment.

Figure 20:
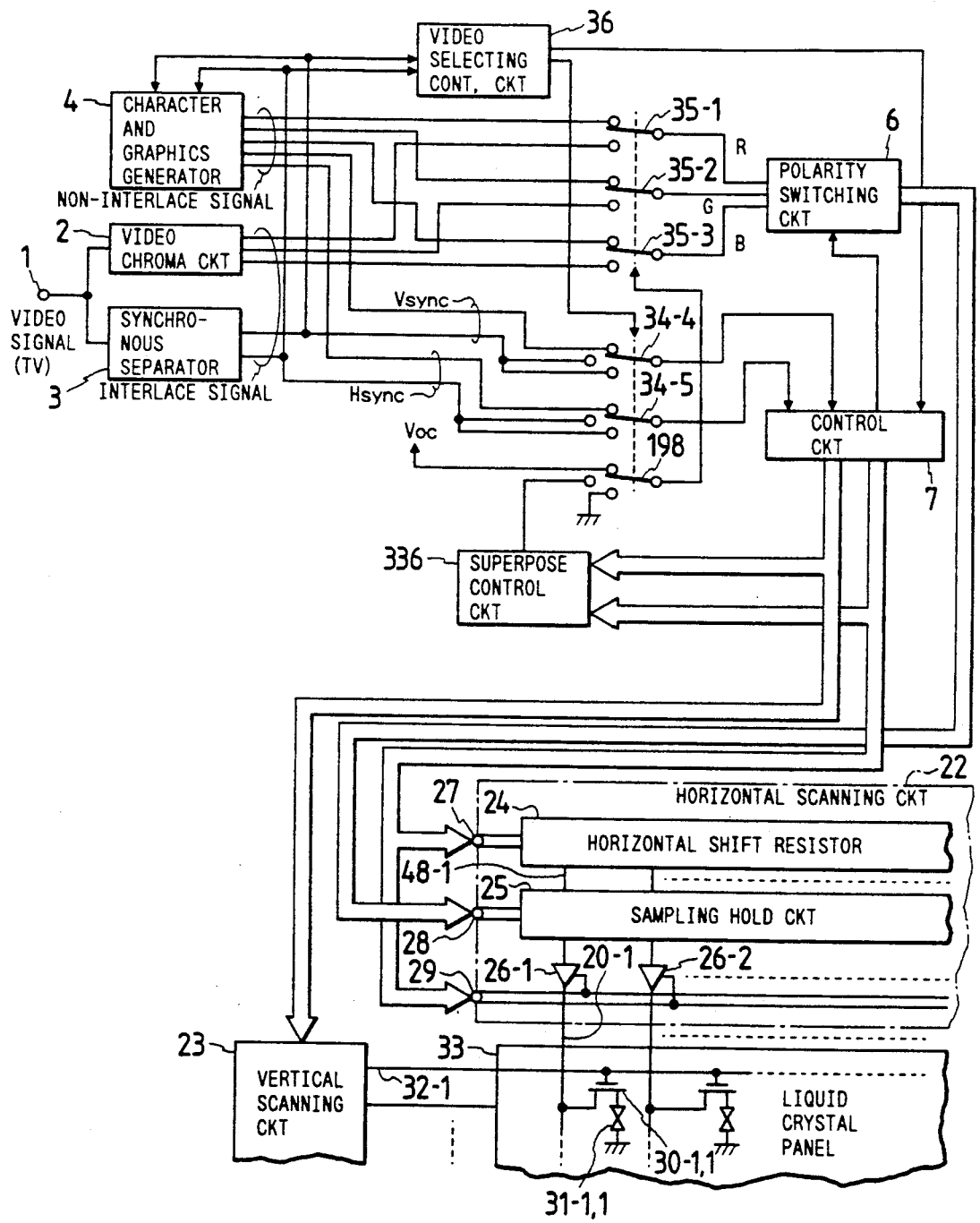
FIG. 20 is a block diagram of a liquid crystal display apparatus as another embodiment of the present invention.
Figure 21A:
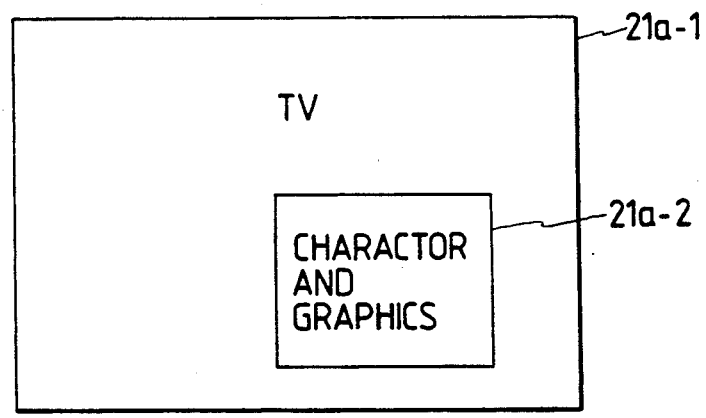
FIG. 21a and FIG. 21b are explanatory drawings showing examples of a window display and a split-screen display.
Figure 21B:
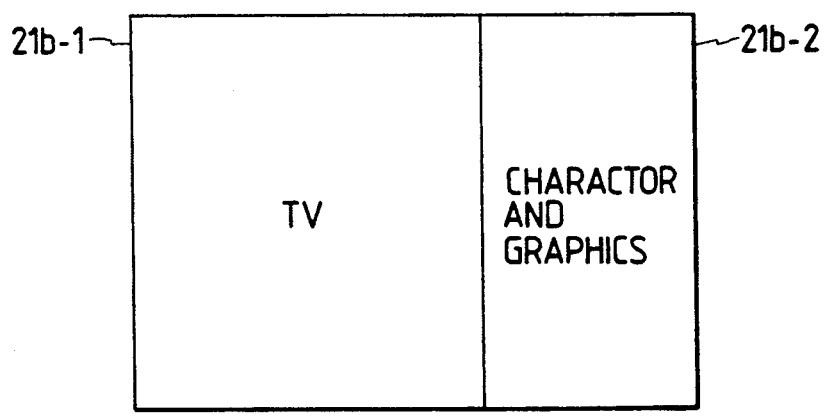

A third embodiment of the present invention is shown in FIG. 20. The embodiment of FIG. 20 is characterized in that the switches 35 are switched by the superpose control circuit 336. By such arrangement, it becomes possible to make a window display as shown in FIG. 21a and a split-screen display as shown in FIG. 21b.

The embodiment of FIG. 20 is that obtained by giving a change to the embodiment of FIG. 2. The points changed include elimination of the analog adders 5, elimination of the selector switches 34-1 to 34-3, addition of selector switches 35-1 to 35-3 and a selector switch 198, and addition of the superpose control circuit 336.

The operation when the window display and the split-screen display are performed is the same as that in the forced non-interlace display in FIG. 2 except that the superpose control circuit 336 controls the switches 35 through the switch 198. Therefore, the operation of the superpose control circuit 336 will be chiefly described here.

Figure 22:
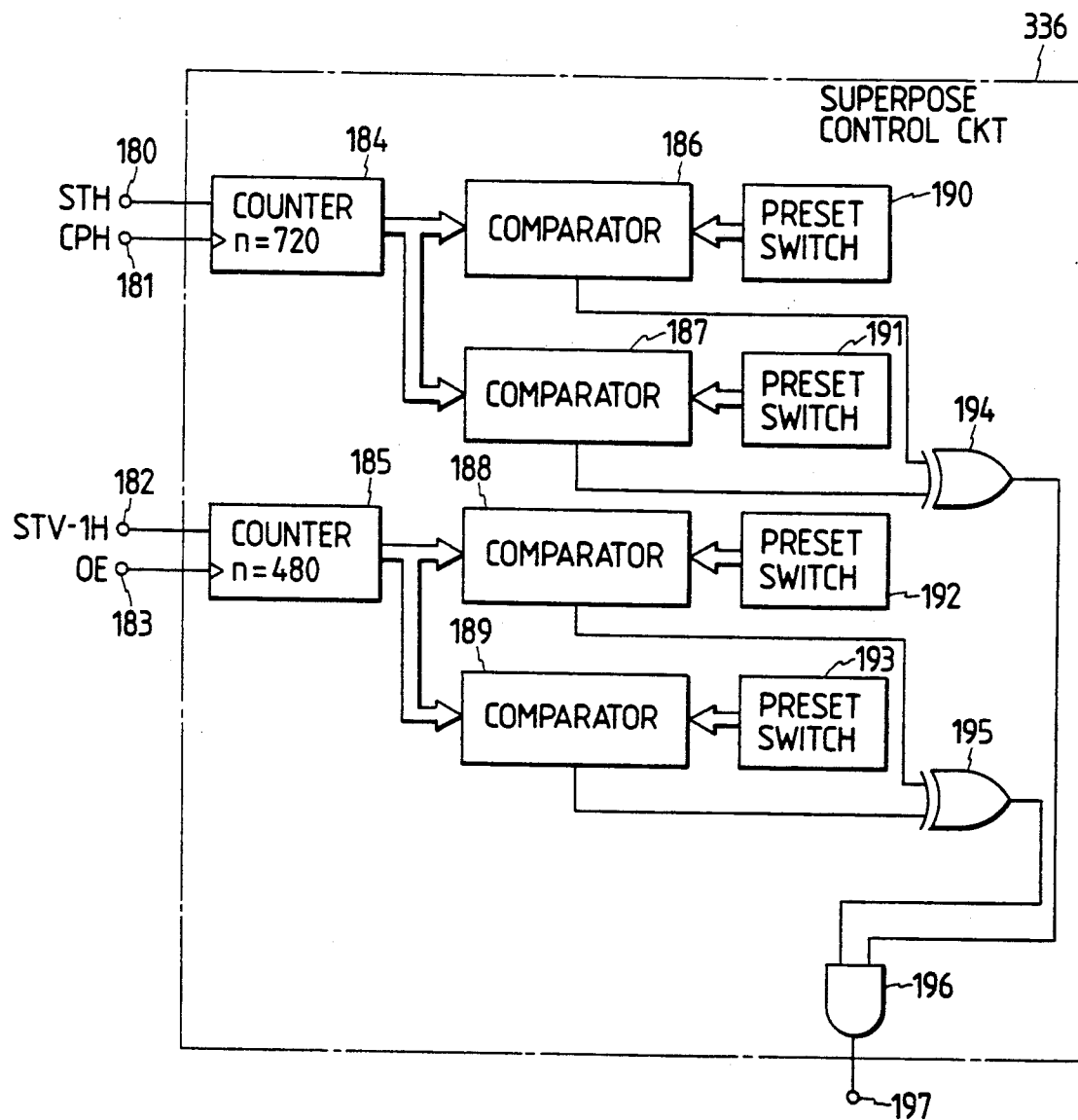
FIG. 22 is a diagram showing a particular configuration of a superpose control circuit of FIG. 20.
Figure 23:
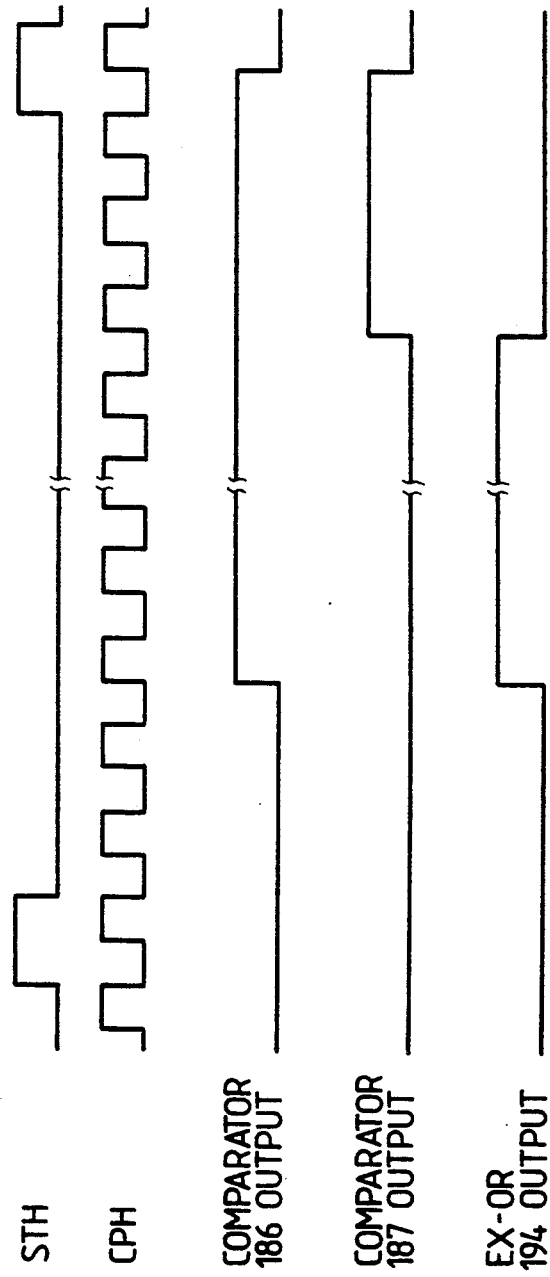
FIG. 23 and FIG. 24 are waveform charts of principal signals in the circuit shown in FIG. 22.
Figure 24:
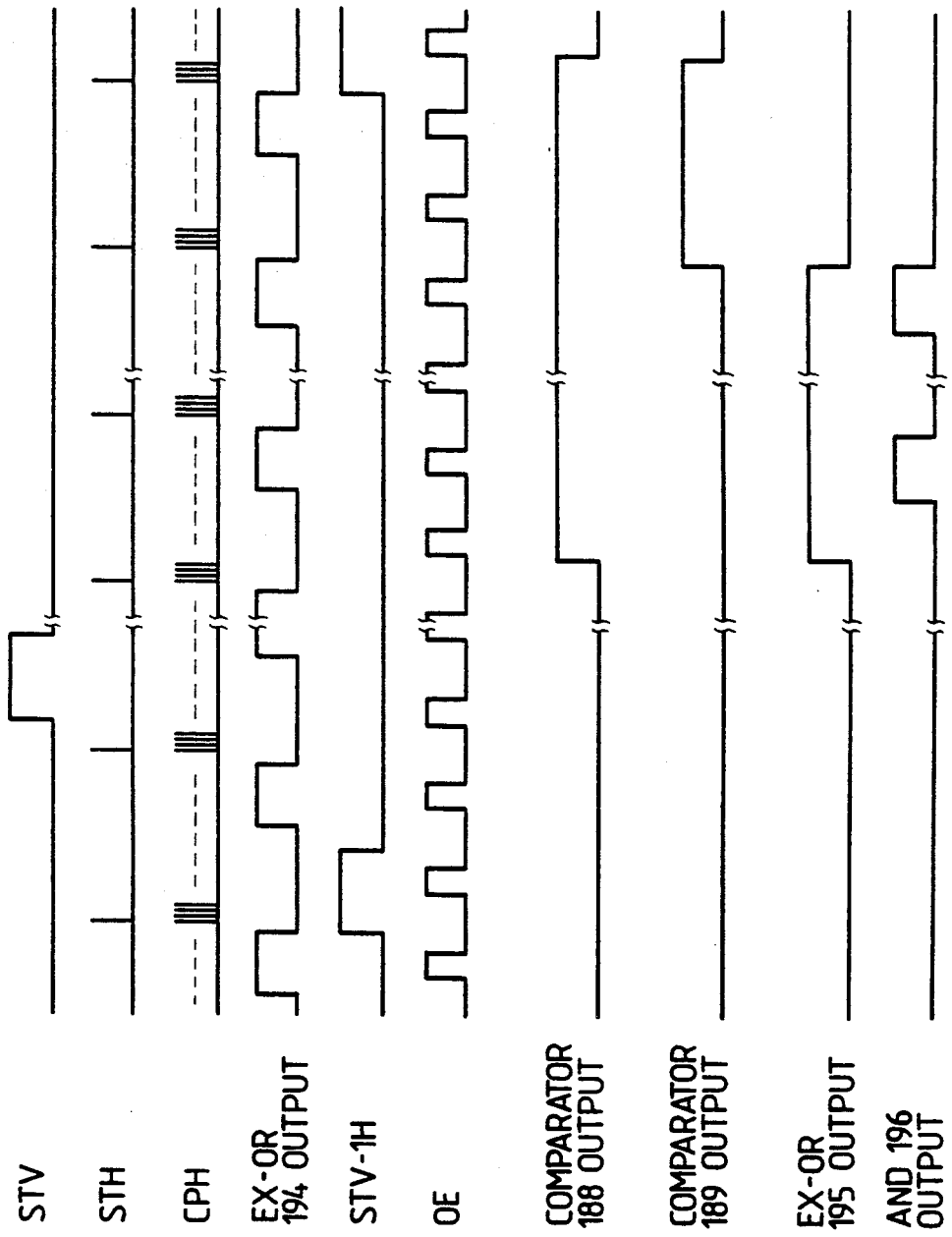

FIG. 22 is a diagram showing a particular configuration of the superpose control circuit 336 and FIG. 23 and FIG. 24 are waveform charts of principal signals provided therein.

From FIG. 22, it is seen that the superpose control circuit 336 comprises counter circuits 184 and 185, comparator circuits 186, 187, 188, and 189, preset switches 190, 191, 192, and 193, exclusive OR circuits 194 and 195, and an AND circuit 196.

The counter 184 sets its initial value to 1 according to the signal STH applied to the terminal 180 and counts the signal CPH applied to the terminal 181. The output of the counter 184 is input to the comparator circuits 186 and 187. The input is compared with each of the values preset by the preset switches 190 and 191.

If the preset value by the preset switch 190 is n=360 and the preset value by the preset switch 191 is n=720, the output of the comparator 186 becomes "H" when n>360 and the output of the comparator 187 becomes "H" when n>720. Therefore, the output of the exclusive OR circuit 194 to which the outputs of the comparators 186 and 187 are input becomes "H" when 360<n<720, which is shown in FIG. 23.

This is the timing at which the selector switches 35 are changed over in one horizontal scanning period. Similarly, the output of the exclusive OR circuit 195 becomes "H" during the period preset by the preset switches 192 and 193 according to the STV-1H and the signal OE applied to the terminals 182 and 183. This is the timing at which the selector switches 35 are changed over during one vertical scanning period.

The signal STV-1H applied to the terminal 182 is advanced with respect to the phase by one horizontal scanning period from the signal STV and it is delivered from the control circuit 7. The counter 185 is set to its initial value 1 at the timing of the signal STV-1H. Further, the preset values of the preset switch 192 and 193 are only arranged to be odd numbers.

The output of the AND circuit 196 to which the outputs of the exclusive OR circuits 194 and 195 are input becomes the logical product of the outputs of the exclusive OR circuits 194 and 195 as shown in FIG. 24, and this output is applied to the terminal 197 and becomes the input to the switch 198.

The switch 198 is controlled by the signal from the video selecting control circuit 336 and, the same, in the case of a forced non-interlace display, is selected by the signal from the video selecting control circuit 336, whereby the switches 35 are controlled. More specifically, the switches 35 are changed over at the timing preset by the preset switches 190 to 193. As a result, a window display or a split-screen display as shown in FIG. 21a and FIG. 21b, for example, of the TV screen and character and graphic screen is provided.

The position of insertion of the subset of image is determined at will by means of the preset switches 190 to 193. As a matter of course, the control circuit 7 is set so that the forced non-interlace display is performed as shown in FIG. 2.

The converting circuit of the vertical synchronizing signal included in the character and graphics generator 4 shown in FIG. 2 is described below.

Figure 25:
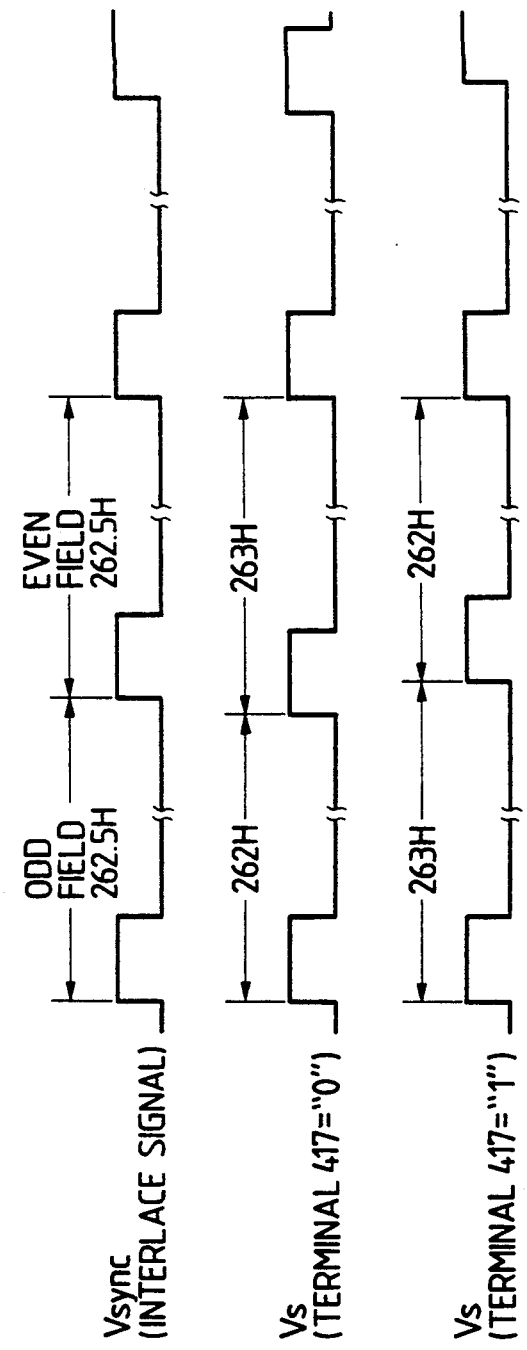
FIG. 25 is a chart showing a timing relationship between the signal before conversion and the signal after conversion of the vertical synchronizing signal by a converting circuit.

FIG. 25 is a timing chart showing the timing relationship between the vertical synchronizing signal before the conversion in such a converting circuit and that after the conversion.

Figure 26:
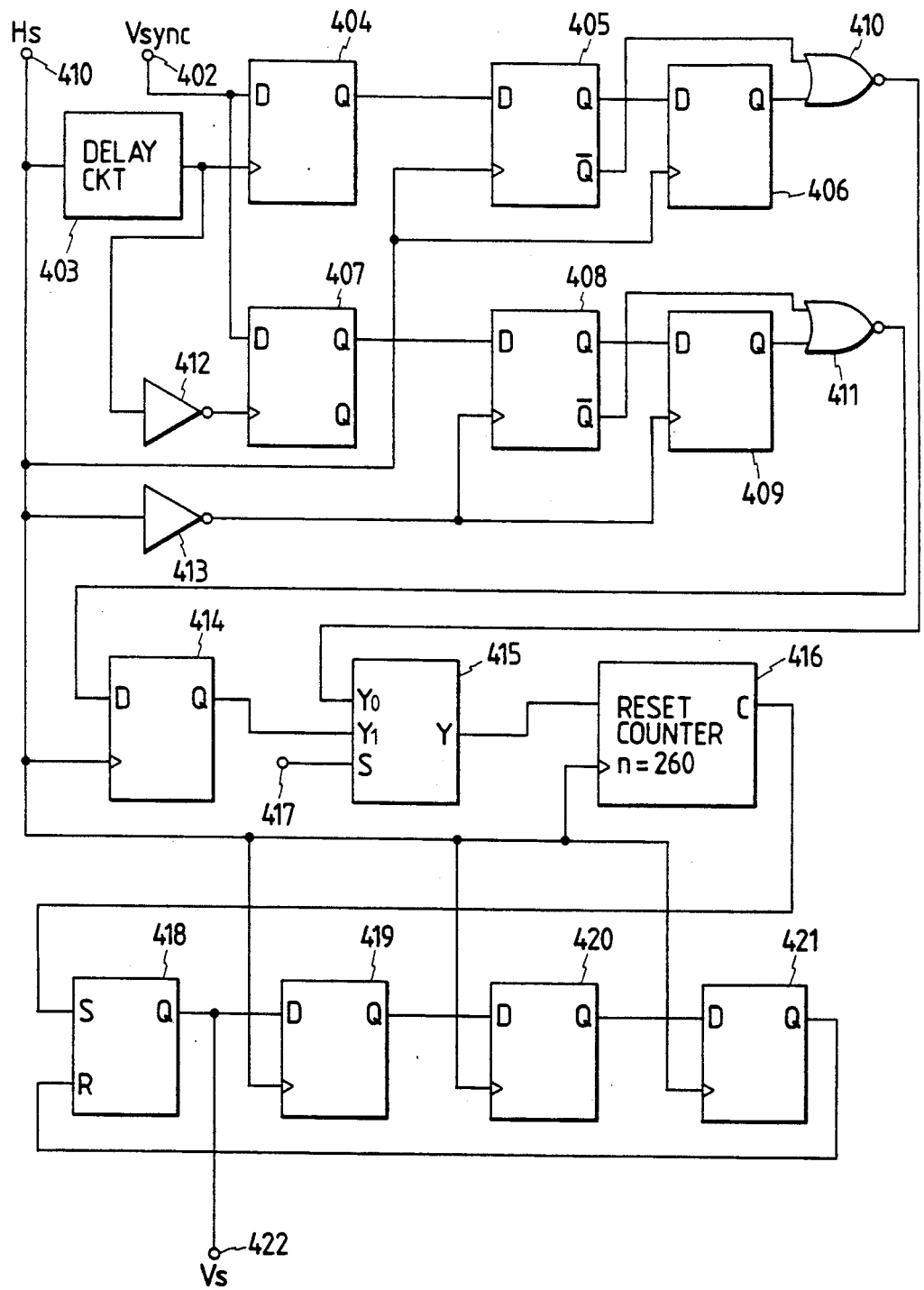
FIG. 26 is a circuit diagram showing an example of a converting circuit of the vertical synchronizing signal.
Figure 27:
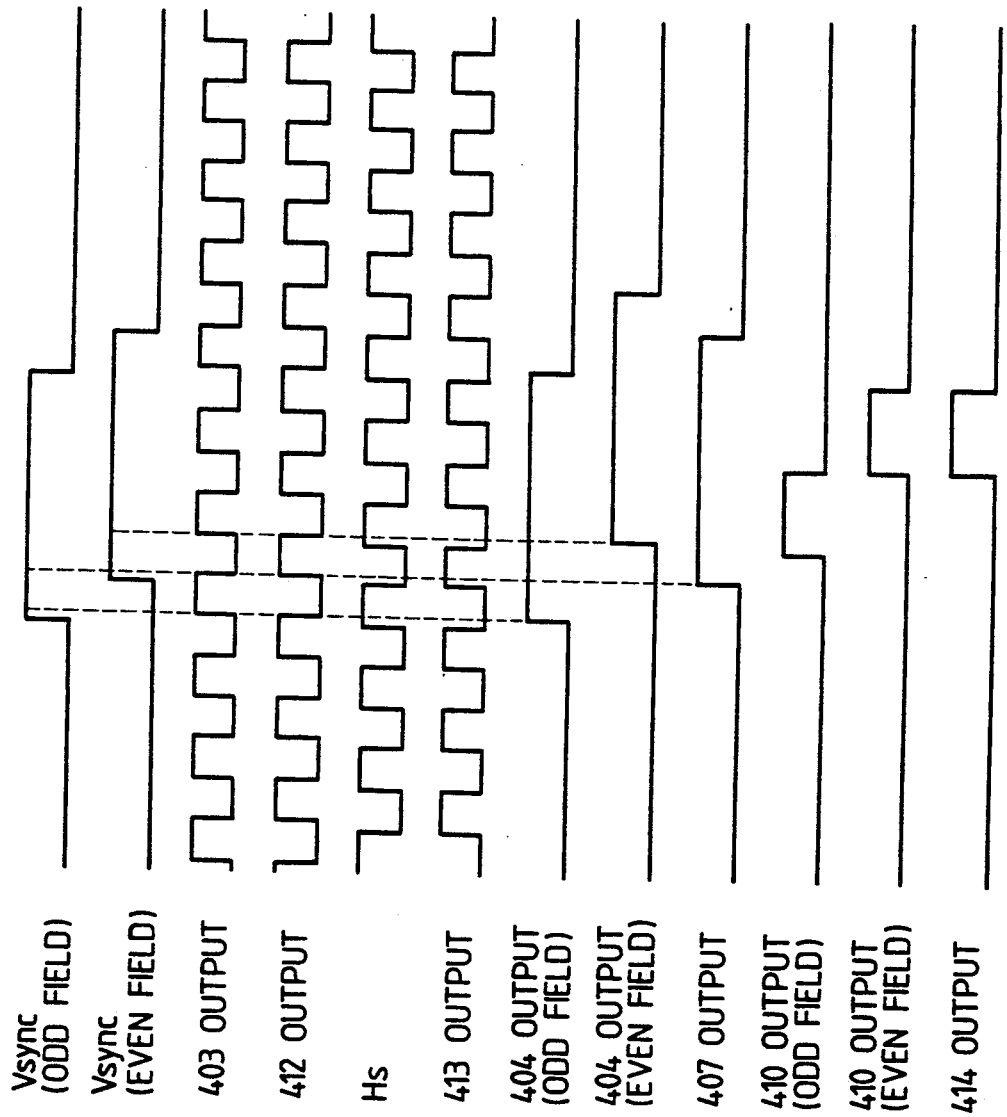
FIG. 27 is a waveform chart related with operations of the circuit shown in FIG. 26.

As shown in FIG. 25, the vertical synchronizing signal for the interlace signal having a period of 262.5H for both the first field and the second field is converted by the converting circuit into a vertical synchronizing signal having a period of 263H (or 262H) for the first field and a period of 262H (or 263H) for the second field and output therefrom. An embodiment of such a circuit is shown in FIG. 26. FIG. 27 is a waveform chart of principal waveforms in the circuit of FIG. 26.

The circuit of FIG. 26 comprises D flip-flops 404 to 409, 414, and 419 to 421, a delay circuit 403, a data selector 415, a counter (n=260) 416, R-S flip-flop 418, inverter circuits 412 and 413, and NOR gates 410 and 411.

The circuit operates in the following manner. The vertical synchronizing signal $V_{sync}$ (interlace signal) applied to the terminal 402 is latched in the D flip-flops 404 and 407. The latching operation is performed at the timing obtained by delaying the signal $H_S$ (a signal in synchronism with the horizontal synchronizing signal and having a duty ratio of 50%) applied to the terminal 401 through the delay circuit 403 and the timing of the inverted signal of the output of the delay circuit 403 (the timing of the output of inverter circuit 412).

Then, the output of the D flip-flops 404 and 407 are input to the D flip-flops 405 and 408 and latched therein at the timing of the signal $H_S$ and the inverted signal of the signal $H_S$ (by the inverter circuit 413), respectively. The outputs Q of the D flip-flops 405 and 408 are input to the D flip-flops 406 and 409. The outputs $\overline{Q}$ of the D flip-flops 405 and 408 are, respectively, input to the NOR gates 410 and 411.

The latching operations of the D flip-flops 406 and 409 are performed at the timing of the signal $H_S$ and the inverted signal of the signal $H_S$ (by the inverter 413 circuit).

The output of the NOR gate 411 is latched in the D flip-flop 414 at the timing of the signal $H_S$. The data selector 415 is supplied with the output of the NOR gate 410 and the output of the D flip-flop 414. One of the supplied signals is selected and output according to the signal "0" or "1" applied to the terminal 417. The output of the data selector 415 becomes a reset signal of the counter 416. The counter 416 counts the signal $H_S$ and the preset counts therein is n=260.

As shown in FIG. 27, the fall of the output pulses of the NOR gate 410 and the D flip-flop 414 becoming the reset signal as described above is 2H to 3H delayed from the rise of the $V_{sync}$. That is, the width of each field is determined by the carry output C of the counter 416. When the signal applied to the terminal 417 is "0", the widths become 262H and 263H. When the signal is "1", the widths become 263H and 262H, for the first field and second field of the interlace signal.

The carry output C of the counter 416 becomes the set input for the R-S flip-flop 418 and the output thereof is applied to the terminal $V_S$.

To make the pulse at the terminal $V_S$ 3H wide, the D flip-flops 419 to 421 constitute a three-step shift register. The output of the R-S flip-flop 418 is delayed and returned to the R-S flip-flop 418 as the reset input therefor.

Through the above described processing, the vertical synchronizing signal for an interlace signal having a period of 262.5H for both of the first field and second field can be converted to a vertical synchronizing signal having a period of 262H (or 263H) for the first field and a period of 263H (or 262H) for the second field.

The character and graphics generator 4 shown in FIG. 2 has the circuit shown in FIG. 26 and the output thereof is in synchronism with the vertical synchronizing signal converted as described above. Thereby, it becomes possible to generate character and graphic signal on the non-interlace system in synchronism with the TV signal on the interlace system.

According to this invention, a character and graphic signal is superimposed on a TV signal without causing sticking. The procedure for switching between the TV signal and the character and graphic signal is eliminated.

Further, by additionally providing a delay circuit, the superimposed display is achieved without deteriorating the vertical resolution of the TV signal.

Besides, by using the superpose control circuit, the position of insertion of a subset of display can be set at any desired position.

Figure 28:
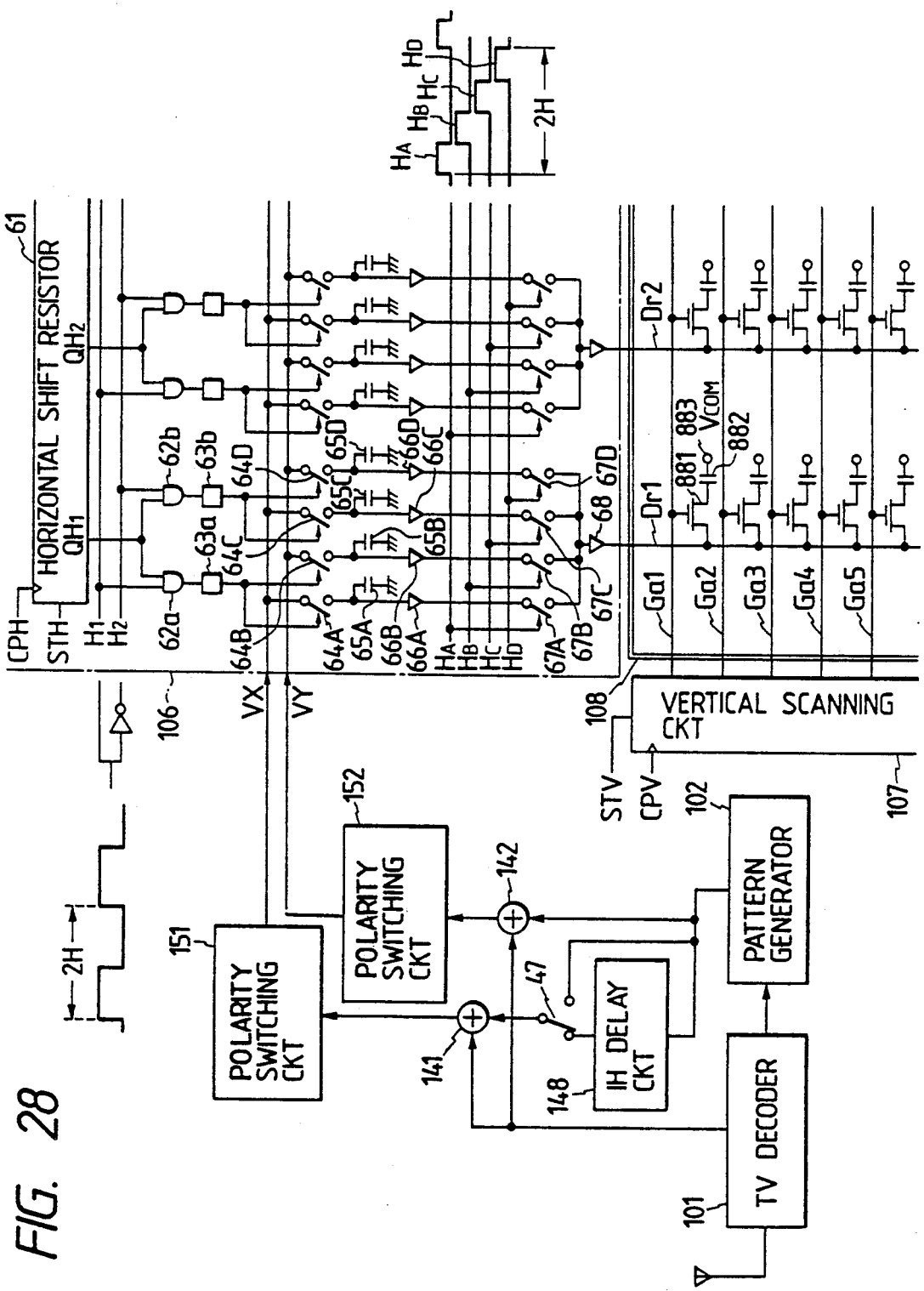
FIG. 28 is a diagram showing a configuration of another embodiment of the present invention.
Figure 29A:
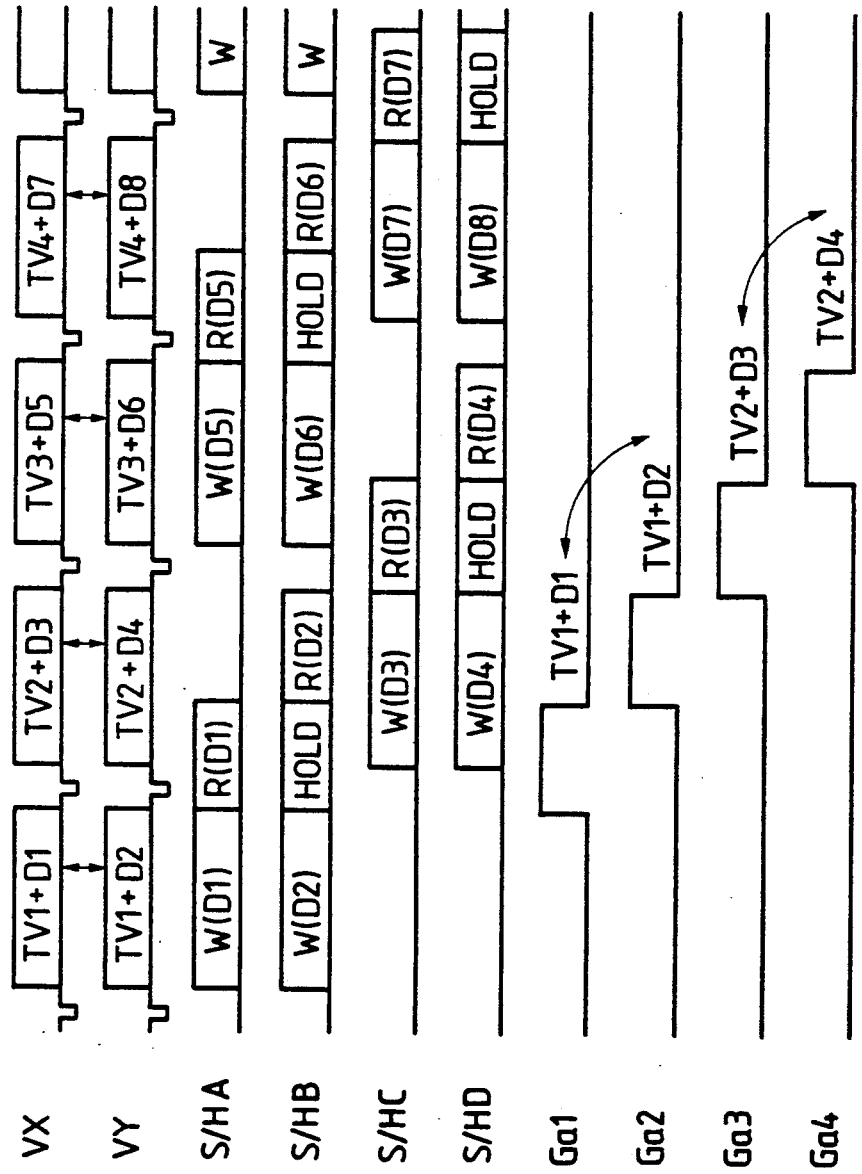

FIG. 28 is a diagram showing a configuration of another embodiment of the present invention. FIG. 29a and FIG. 29b are diagrams for explaining the operation of the embodiment.

Referring to FIG. 28, reference numeral 101 denotes a TV receiver (including a TV decoder), 102 denotes a pattern generator for outputting display data such as characters and graphics in synchronism with the TV signal, 147 denotes a changeover switch for performing switching for each field, 141 and 142 denote signal adders, 148 denotes a 1-H delay circuit, 106 denotes a horizontal scanning circuit, 107 denotes a vertical scanning circuit, and 108 denotes a TFT (thin film transistor) liquid crystal panel.

Entering into details, 61 denotes a horizontal shift register, 62a and 62b denote AND gates for sampling control, 63a and 63b denote level shifters, 64A, 64B, 64C, and 64D denote sampling switches, 65A, 65B, 65C, and 65D denote holding capacitors (corresponding to a line memory), 66A, 66B, 66C, and 66D denote buffer amplifiers, 67A, 67B, 67C, and 67D denote output selector switches, 68 denotes an output buffer amplifier, 181 denotes a TFT (thin film transistor), 182 denotes a liquid crystal cell, Ga1, Ga2, Ga3, ... denote row signal lines of the TFT liquid crystal panel 107, Dr1, Dr2, Dr3, ... denote column signal lines of the TFT liquid crystal panel 107, and 183 denotes a common counter electrode of the TFT liquid crystal panel.

Referring to FIG. 29a and FIG. 29b, W denotes the sampling (writing) operation, R denotes the reading operation, TVn (n=1, 2, 3, ... ) in VX and VY denote the TV signal in the nth scanning line, and Dm (m=1, 2, 3, ... ) denote the character and graphic data to be written in the mth line of the TFT liquid crystal panel 108.

The present embodiment is an example of the case where the quantity of information of the character and graphic signal in the vertical direction is equal to the quantity of information of one field of the television. D1 and D2, D3 and D4, D5 and D6, ... indicated by arrows represent quantities of information equal to each other. In other words, the present embodiment shows the case where display data of the non-interlace system of 240 vertical scanning lines is superimposed on the TV signal of the NTSC system.

First, outline of the double line scanning system will be described. In the horizontal scanning circuit 106, the horizontal shift register 61 is a circuit to which a start pulse STH and a shift clock CPH are input and from which sampling pulses QH1, QH2, ... are sequentially output in synchronism with the shift clock CPH. The outputs thereof are required in the same number as the number of horizontal pixels of the TFT liquid crystal panel 108.

H1 and H2 are selecting signals having logical levels being different from each other and inverted for each horizontal scanning period of the TV signal. Below will be given description narrowed down to one output of the horizontal shift register 61.

The output of the horizontal shift register 61, i.e., the sampling pulse output from QH1, for example, is input to the AND gates 62a and 62b and alternately selected by the selecting signals H1 and H2 for each horizontal scanning period to be transmitted to the level shifters 63a and 63b. The level shifters 63a and 63b are converting circuits for shifting level of signals from the horizontal shift register 61 and the AND gates 62a and 62b (those, for example, from TLL and CMOS) to logical signals necessary for driving the sampling switches 64A, 64B, 64C, and 64D.

The outputs of the level shifters 63a and 63b are respectively input to control terminals of the sampling switches 64A, 64B and 64C, 64D. The sampling switches 64A, 64B, 64C, and 64D and the holding capacitors 65A, 65B, 65C, and 65D respectively form four sample-and-hold circuits.

Accordingly, as shown in FIG. 29a and FIG. 29b, the sample-and-hold circuits S/HA (64A, 65A) and S/HB (64B, 65B) to which the outputs of the level shifter 63a are input perform writing operation in one horizontal scanning period. The sample-and-hold circuits S/HC (64C, 65C) and S/HD (64D, 65D) to which the outputs of the level shifter 63b are input perform writing operation in the subsequent horizontal scanning period.

Meanwhile, the voltages held in the sample-and-hold circuits are input to the selector switches 67 through the buffer amplifiers 66. The voltages are held by those sample-and-hold circuits which have not been selected by the selecting signal H1 or H2 and are not performing sampling operation are sequentially selected by selecting signals $H_A$, $H_B$, $H_C$, and $H_D$. These voltages are output to the column signal line of the TFT liquid crystal panel through the output buffer 68.

The selecting signals $H_A$, $H_B$, $H_C$, and $H_D$ are each for selecting one of the selector switches 67A, 67B, 67C, and 67D during ½ horizontal scanning period at intervals of two horizontal scanning periods. These signals with suffixes A, B, C, and D are adapted to sequentially switch the outputs so that the selected periods thereby may not overlap each other.

Now, we consider the operation in the ODD field and that in the EVEN field, separately. First, in the ODD field, the sample-and-hold circuits S/HA and S/HB, in the first horizontal scanning period, respectively perform the sampling operation. In the second horizontal period, they sequentially perform reading operation time-divisionally in the order from A to B and output the read data to the column signal line through the output buffer 68.

On the other hand, the sample-and-hold circuit S/HC and S/HD, in the second horizontal scanning period, perform writing operation. In the third scanning period, they sequentially perform reading operation time-divisionally in the order from C to D and output the read data to the column signal line through the output buffer 68. During this period, the sample-and-hold circuits S/HA and S/HB perform sampling operation, and these operations are repeated.

In the present case, the video signals VX and input VY to the sample-and-hold circuits S/HA S/HC and S/HB, S/HD are both generated from the same source but they are separated and independent of each other. Therefore, if display data Dm (m=1, 2, . . . ) of characters, graphics, and the like are mixed in the signals VX and VY for superimposition and input to the circuit as shown in FIG. 29a (for the case of ODD field). Then, reading into the column signal line Dr is performed in the order of S/HA, B, C, and D. Since the signal VX is written in the sample-and-hold circuits S/HA and S/HC, while the signal VY is written in the sample-and-hold circuits S/HB and S/HD, the signals read onto the column signal line Dr become (TV1+D1), (TV1+D2), (TV2+D3), (TV2+D4), (TV3+D5), (TV3+D6), . . . . Then, by having the write pulses Ga1, Ga2, Ga3, . . . output in the order named from the vertical scanning circuit 7 in synchronism with the above mentioned signals on the column signal line, the TFTs 181 in the respective horizontal lines are rendered conductive.

Thus, writing the signals (TV1+D1), (TV1+D2), (TV2+D3), (TV2+D4), . . . on the column signal line Dr into the liquid crystal cells 182 in the respective horizontal lines is achieved.

The video signal input as the signal VX is written in the odd line and the video signal input as the signal VY is written in the even line. The adjoining two lines are driven by the video signals input as the signals VX and VY in one horizontal scanning period. If, as described earlier, the data D1 and D2, D3 and D4, D5 and D6, . . . are equal, it is achieved that adjoining two lines are driven by signals equal for both the TV data and the display data, i.e., the combinations of the TV data and display data are equal to each other.

Quite the same operation as that in the ODD field is performed in the EVEN field, but the operation therein corresponds to the interlace TV signal as shown in FIG. 29b (for the case of ODD field). Hence, the output timing of the vertical scanning circuit 7 becomes somewhat different.

Since sampling by the sample-and-hold circuits S/HA and S/HB is started form the 263rd scanning line of the TV signal and vertical scanning is performed in the order of Ga1, Ga2, Ga3, . . . starting at the timing when the data held in the sample-and-hold circuit S/HB is read out, the operation is performed, conversely to that in the ODD field, such that the even line is driven by the input VX and the odd line is driven by the input VY.

Therefore, when display data such as characters and graphics are superimposed on the TV signal in the video signal and the video data is displayed, if the display data are arranged to be included in the input VX and the input VY the same as the TV signal, the combination of the two lines driven by the same signal becomes different as with the TV signal for each field, whereby the earlier described problems arise.

Therefore, such a system has been adopted in which different signals are included in the inputs VX and VY for the display data. That is, the input VX is arranged to include data preceding the data included in the input VY by one horizontal scanning period as shown in FIG. 29b. The signals in the input VX and the input VY connected by arrows are assumed to be equal to each other, only different in timing by one horizontal period. Thus, by arranging such that the same signal is divided for two horizontal scanning lines and included in the different video inputs VX and VY, the difference in the timing between the Ca1, Ca2, . . . is corrected. That is, while the combination of the two lines driven by the same signal is shifted from field to field for the TV signal, the combination in the two lines driven by the same signal is made equal for each field for the display data.

Onto the column signal line in the EVEN field as shown in FIG. 29b, signals (TV263+D1), (TV264+D2), (TV264+D3), . . . are output in the order named, and the system is apparently different from that for the TV signal.

By the non-interlace driving system (the system in which the timing of the GA1, Ga2, Ga3, . . . is not shifted), a superimposed display of the display data on the TV signal is achieved without deteriorating the resolution of the TV signal and causing any trouble of sticking.

Referring to FIG. 28, the display data output from the pattern generator 102 for outputting the display signal of characters, graphics, and the like is superimposed as it is on the TV signal in the adder 142 and turned into the input VY through the polarity switching circuit 152.

On the other hand, the display data output from the pattern generator 102 is input to the changeover switch 147 either directly or passed through the 1-H delay circuit 148. The directly input signal is selected in the ODD field, and the delayed signal is selected in the EVEN field, and the selected signal is superimposed on the TV signal in the adder 141 and connected with the input VX through the polarity switching circuit 151.

The polarity switching circuits 151 and 152 reverses the polarity of the video signal from the need for driving the liquid crystal display elements. In the case of FIGS. 29a and 29b, both the polarity switching circuits 151 and 152 function to provide positive polarity in the ODD field and negative polarity in the EVEN field.

Figure 30:
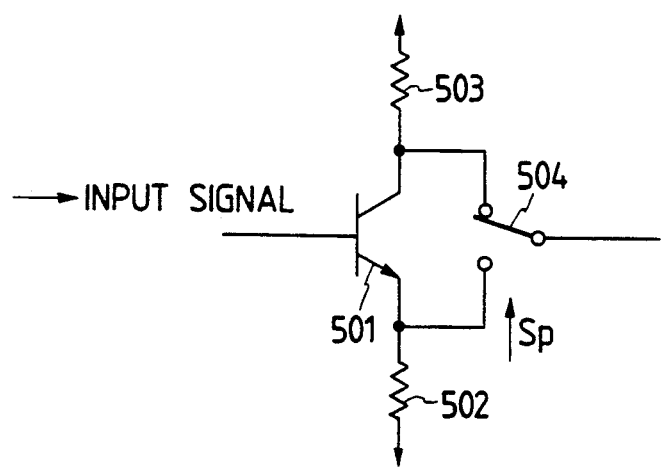
FIG. 30 is a circuit diagram showing a particular configuration of a polarity switching circuit.

Particular example of the polarity switching circuit 151, 152 is shown in FIG. 30. A transistor 501 and resistors of the same resistance 502 and 503 constitute a common-emitter amplifier with a gain of 1 and its output is switched by a switch 504. The control signal Sp for the switch 501 is reversed for each field.

Figure 31:
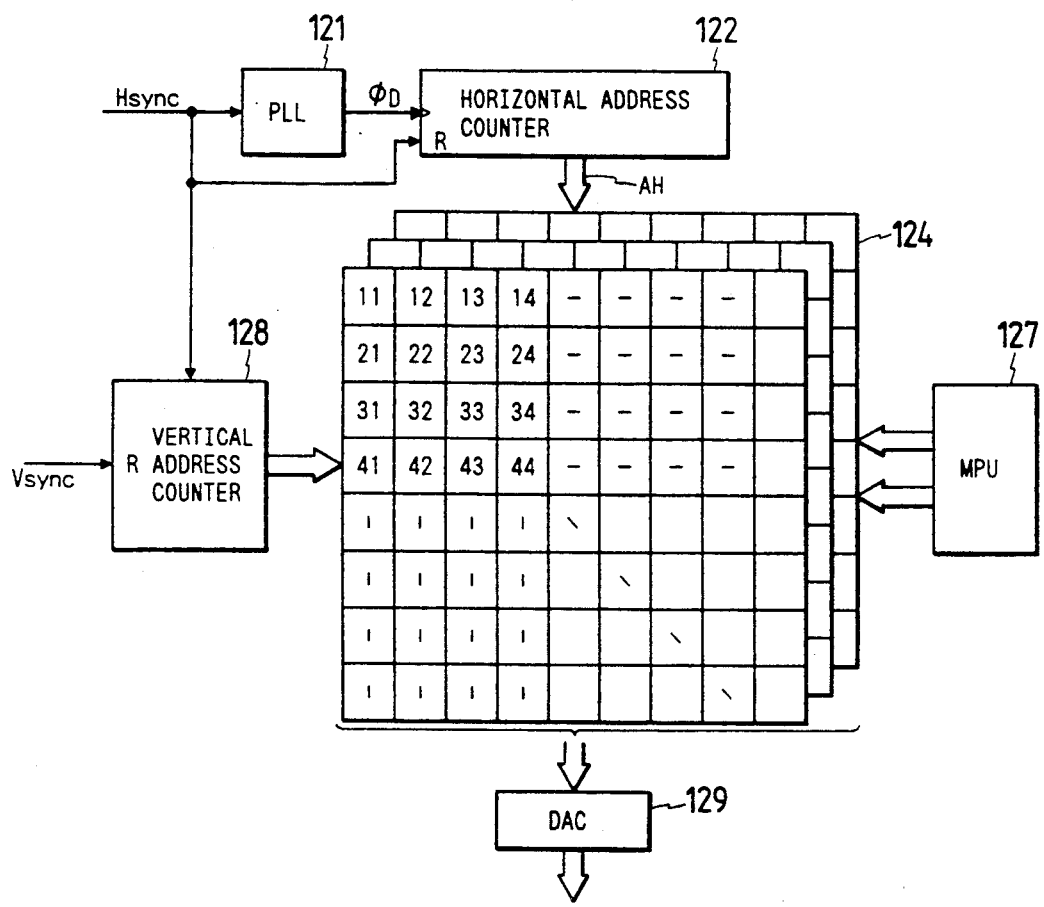
FIG. 31 is a block diagram showing a particular example of a configuration of a pattern generator in FIG. 28.

FIG. 31 is a diagram showing a particular example of a structure of a pattern generator 102 in FIG. 28, in which there is shown a video signal generator of a frame memory type.

Referring to FIG. 31, a high speed clock $\phi_D$ is generated in the PLL (phase-locked loop) 121 on the basis of the horizontal synchronizing signal $H_{sync}$ and the vertical synchronizing signal $V_{sync}$ of the TV signal and the clock is input to the horizontal address counter 122. The horizontal address counter 122, reset by the horizontal synchronizing signal $H_{sync}$ or a signal in synchronism therewith, performs counting operation using the signal $\phi_D$ as the clock and generates horizontal addresses AH.

Meanwhile, the vertical address counter 128, reset by the vertical synchronizing signal $V_{sync}$ or a signal in synchronism therewith, performs counting operation according to the horizontal synchronizing signal $H_{sync}$ or a signal in synchronism therewith and generates vertical addresses.

Read addresses output from the horizontal address counter 122 and the vertical address counter 128 are input to the frame memory 124. The frame memory 124 outputs data at the corresponding addresses. The data in the frame memory 124 can be previously written at will using the MPU (microprocessor unit) 127. Reference numeral 129 denotes a DAC (digital analog converter) for converting a read digital signal into an analog signal.

Figure 32:
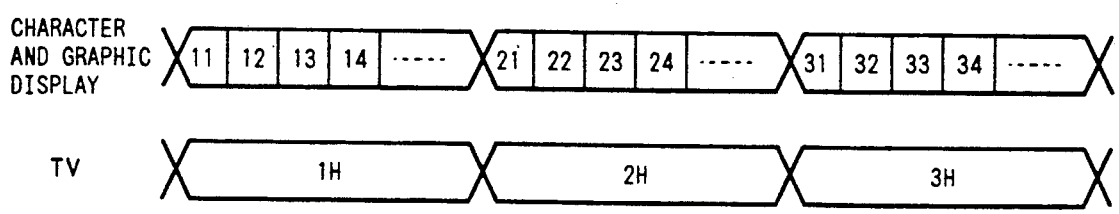
FIG. 32 is an output timing chart of principal signals in FIG. 31.

FIG. 32 shows the output timing of the display signal read out from the frame memory 124 in comparison with that of the TV signal.

Figure 33:
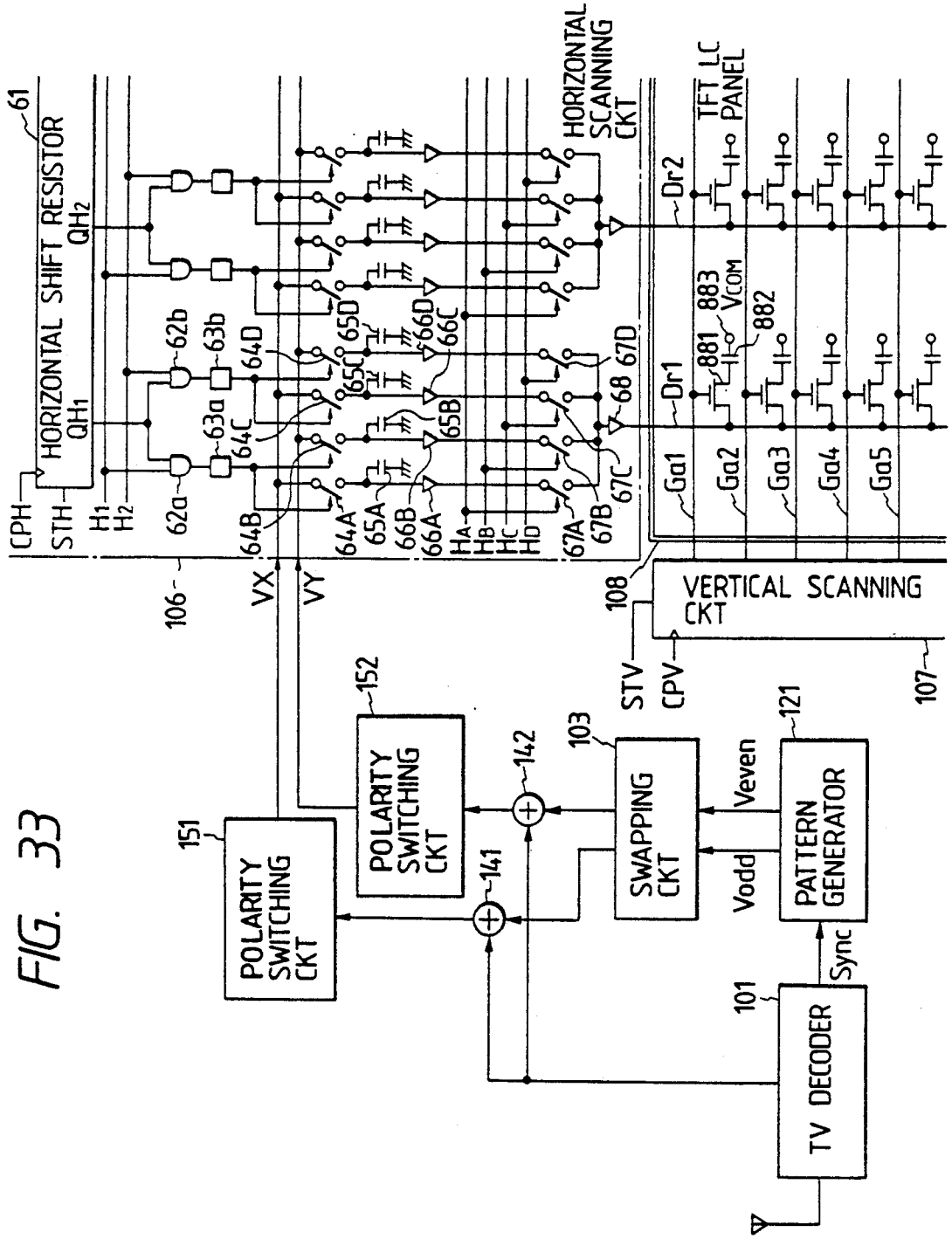
FIG. 33 is a diagram showing a configuration of another embodiment of the present invention.

FIG. 33 is a configuration diagram showing another embodiment of the present invention. This embodiment is virtually the same in configuration as the circuit of FIG. 28 only differing therefrom in the configuration of the pattern generator 121 and that a swapping circuit 103 is provided in this embodiment.

The embodiment shown in FIG. 28 was such that the display signal of characters and graphics had only the information quantity corresponding to the scanning lines of one field of the TV signal. More specifically, it was such an embodiment in which non-interlace display data of horizontal scanning lines being 240 in number in the vertical direction was displayed superimposed on a TV signal of the NTSC system. However, since there are provided two independent video signal inputs, VX and VY, and each can drive adjacent two lines, it is possible, in principle, to make a display with a display signal having an information quantity corresponding to the scanning lines for two fields of a TV signal superimposed on the TV signal.

Namely, it should be possible to display a non-interlace display signal with horizontal scanning lines being 480 in number in the vertical direction superimposed on a TV signal of the NTSC system. FIG. 33 is an embodiment to realize such a display system.

The operation of the circuit is the same as that in FIG. 29a and FIG. 29b. In the case of the embodiment shown in FIG. 28, the portions of the inputs VX and VY connected by arrows in FIG. 29b were driven by the same signal. However, if it is arranged such that these are driven by different signals, the vertical resolution of the display data of characters, graphics, and the like is readily doubled. Accordingly, in the present embodiment, the pattern generator 21 is allowed, in synchronism with the TV signal, to generate display signals $V_{odd}$ and $V_{even}$ (whose horizontal scanning frequency $f_H$ and vertical scanning frequency $f_V$ are equal to those of the TV signal) to be displayed in the odd line and the even line of a TFT liquid crystal panel. Further, the swapping circuit 103 is allowed to swap signals so that the display signal $V_{odd}$ for the odd line is added to the input VX and the display signal $V_{even}$ for the seven line is added to the input VY in the first field. Conversely, the display signal $V_{even}$ for the even line is added to the input VX and the display signal $V_{odd}$ for the odd line is added to the input VY in the second field.

By arranging as described above, that is, by swapping the odd line with the even line of the display signal, the difference between the odd line and the even line of the display signal, which is caused by the arrangement for the TV signal for changing the combination of two lines driven by one horizontal scanning signal for every field, can be corrected.

According to the above described embodiment, the superimposed display of characters, graphics, and the like on a TV signal is achieved without causing sticking while enhancing the vertical resolution of the display.

Figure 34:
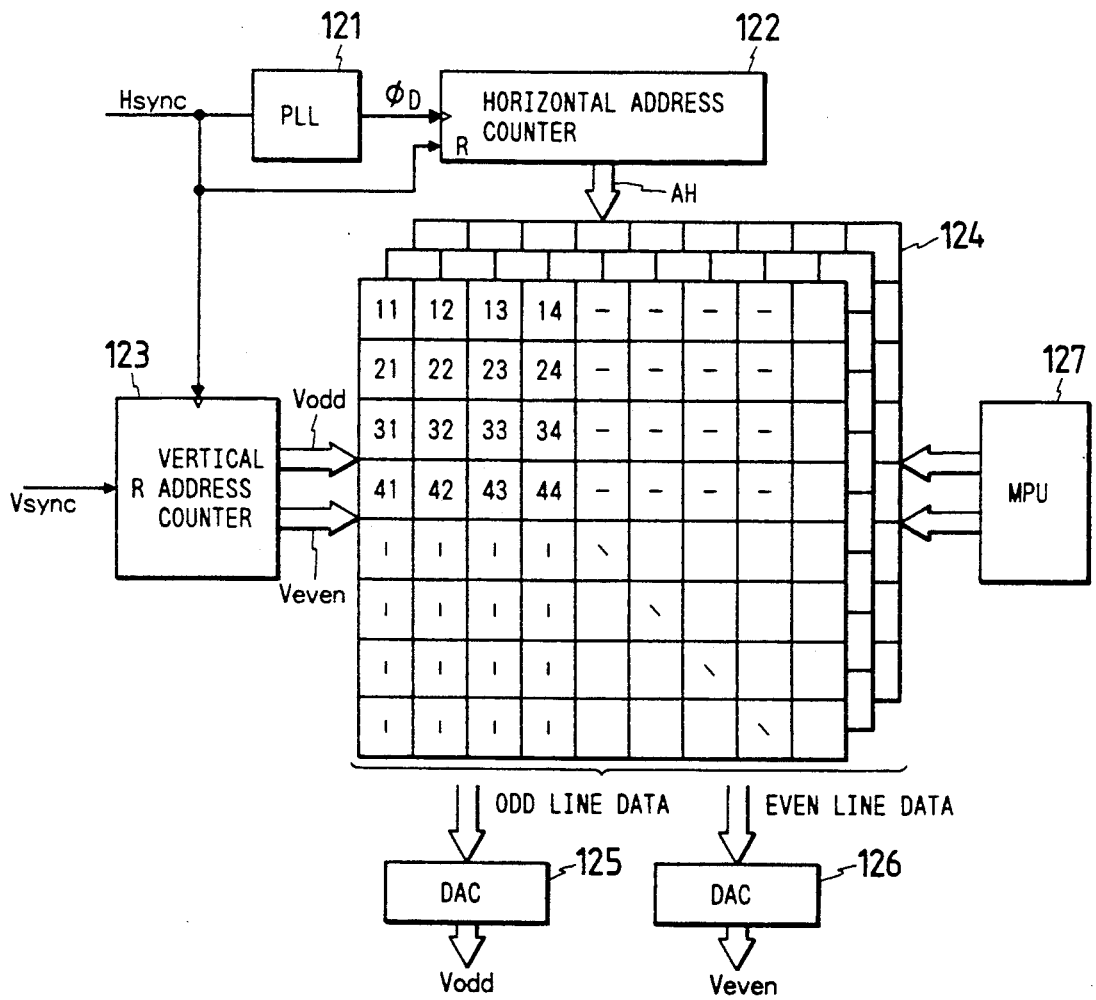
FIG. 34 is a block diagram showing an example of a particular configuration of a pattern generator in FIG. 33.

FIG. 34 is a circuit diagram showing a particular, realized example of a pattern generator 121 in FIG. 33. This circuit has virtually the same configuration as the circuit in FIG. 31. In this case, however, the vertical address generator 123 simultaneously generates the vertical address $AV_{odd}$ for the data of the odd line and the horizontal address $AV_{even}$ for the data of the even line in parallel. The display signals for the odd line and the even line are simultaneously read out from the frame memory 124 so as to be output as $V_{odd}$ and $V_{even}$ through the DAC 125 and DAC 126, respectively.

Figure 35:
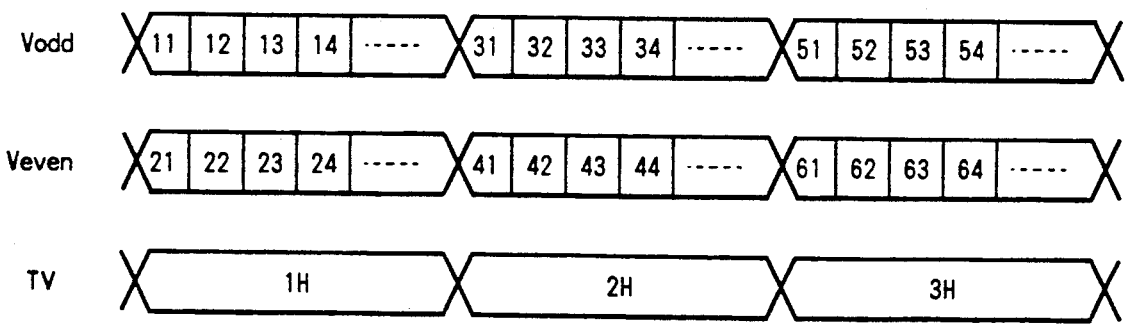
FIG. 35 is an output timing chart of principal signals in FIG. 33.

At this time, arranging the vertical addresses of the adjoining two lines, 111 and 121, 112 and 122, 113 and 123, . . . , of the frame memory 124 to be the same and providing the addresses $AV_{odd}$ and $AV_{even}$ with the same address, it becomes possible, as seen from the output timing chart of FIG. 35, to obtain the display data $V_{odd}$ and $V_{even}$ of characters and graphics for the odd and even lines simultaneously, in synchronism with the TV signal. In the second field, the address $AV_{even}$ is output to be $AV_{odd}$ 1.

FIG. 36 is a configuration diagram of another embodiment of the present invention. Referring to the diagram, U6 and D6 denote horizontal scanning circuits, disposed at the upper side and lower side of the TFT liquid crystal panel 188, respectively for driving odd lines and even lines of the TFT liquid crystal panel 188.

Reference characters L7 and R7 denote vertical scanning circuits, disposed on the left and right of the TFT liquid crystal panel 188, for similarly driving the odd lines and even lines of the TFT liquid crystal panel 188. The TFT liquid crystal panel 188 is correspondingly arranged such that even-numbered row signal lines Ga are led out to the left-hand side and odd-numbered row signal lines Ga are led out to the right-hand side. Two two column signal lines Dr are provided for each column of pixels, of which one signal line Dr is connected with pixels in the odd-numbered lines and led out as a line DrU to the upper side and the other signal line Dr is connected with pixels in the even-numbered lines and led out as a line DrD to the lower side.

Thus, pixels in the odd-numbered lines are adapted to be driven by the horizontal scanning circuit U6 at the upper side and the vertical scanning circuit L7 on the left-hand side. Pixels in the even-numbered lines are adapted to be driven by the horizontal scanning circuit D6 at the lower side and the vertical scanning circuit R7 on the right-hand side. These two groups of pixels are adapted to be driven independently of each other.

The horizontal scanning circuit D6 at the lower side has an internal configuration completely symmetrical with the horizontal scanning circuit U6 at the upper side.

VU and VD respectively denote video input signals supplied to the upper and lower horizontal scanning circuit U6 and D6.

Figure 37A:
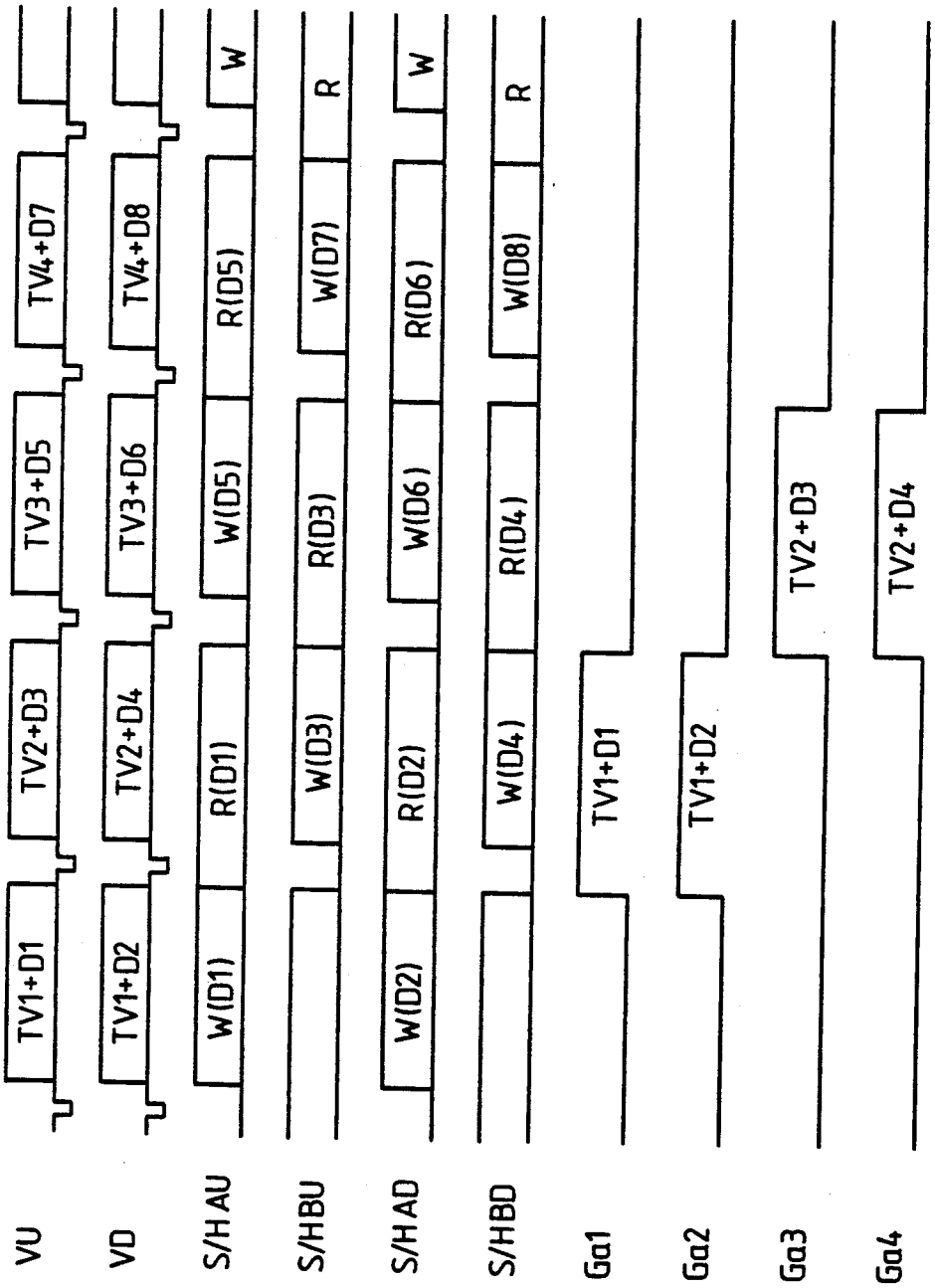
FIG. 37 is an explanatory diagram of the embodiment shown in FIG. 36.

FIG. 37 is a diagram for explaining the operation of FIG. 36. The operation of the circuit of FIG. 36 is described below referring to FIG. 37.

The horizontal shift register U61, selecting signals H1 and H2, AND gates U62a and U62b, and level shifters U63a and U63b are completely the same in structure as those in the embodiment of FIG. 28. The level shifters U63a and U63b output sampling pulses, and thereby, the sample-and-hold circuit S/HAU formed of the sampling switch U64a and holding capacitor U65a and the sample-and-hold circuit S/HBU formed of the sampling switch U64b and holding capacitor U65b in the subsequent stage are caused to perform sampling operation.

The present embodiment differs from the embodiment of FIG. 28 in that the number of sample-and-hold circuits within the horizontal scanning circuit U6 is reduced to half, i.e., to two. This is because the number of pixels driven by one horizontal scanning circuit is reduced to half. By adding up the number of pixels driven by the upper and lower horizontal scanning circuits, the number becomes the same.

In the horizontal scanning circuit U6, operations are switched in accordance with the selecting signals H1 and H2 such that, in one horizontal scanning period, the sample-and-hold circuit S/HAU performs a sampling operation and the sample-and-hold circuit S/HBU performs a reading operation. In the subsequent horizontal scanning period, conversely, the sample-and-hold circuit S/HAU performs a reading operation and the sample-and-hold circuit S/HBU performs a writing operation.

The sample-and-hold circuits S/HAU and S/HBU respectively connected with the selector switches U67a and U67b through the buffers U66a and U66b. The signal sampled and held by each sample-and-hold circuit as a result of the above described operations is read out, in accordance with the selecting signal Ha and Hb, onto the column signal line through the output buffer 68. The selecting signals Ha and Hb are signals equivalent to the selecting signals H2 and H1.

The horizontal scanning circuit D6 at the lower side performs the same operations as above and, hence, the sample-and-hold circuits within the lower horizontal scanning circuit D6 are represented by S/HAD and SW/HBD in FIG. 37.

Now, if it is adapted, as shown in FIG. 37, such that, for the TV signal, that of the same scanning lines is included in both of the inputs VU and VD, and, for the display signals of characters and graphics, the data of the odd line is superimposed on the TV signal in the input VU and the data of the even line is superimposed on the TV signal in the input VS. IF the row signal lines Ga are selected as shown in the diagram, the transistors TFT 881 connected to the row signal lines are turned on. Thereby writing into the liquid crystal cells 882 of the TFT liquid crystal panel 188 is achieved.

At this time, by shifting the timing to select the row signal lines Ga from field to field, i.e., by operating the vertical scanning circuits L7 and R7 on both left and right sides at the same timing in the ODD field and, in the EVEN field, by delaying the operation of the vertical scanning circuit R7 on the right-hand side one horizontal scanning period from the vertical scanning circuit L7 on the left-hand side; such an effect, as obtained in the embodiment of FIG. 28, is obtained that two lines are driven by the signal for one horizontal scanning for the TV signal and the combination of the two lines are shifted for the ODD line and the EVEN line.

On the other hand, for the display signal of characters and graphics, it becomes possible to write data of the same line into the pixels in the same line for both ODD and EVEn fields.

According to the embodiment of FIG. 36, the same effect as obtained in the embodiment of FIG. 28 is obtained, the need for the swapping circuit 103 is eliminated, and sufficient writing time into each pixel (liquid crystal cell 882) is obtained. But the scanning circuits are provided on the four sides and the number of the column signal lines is doubled.

Figure 38:
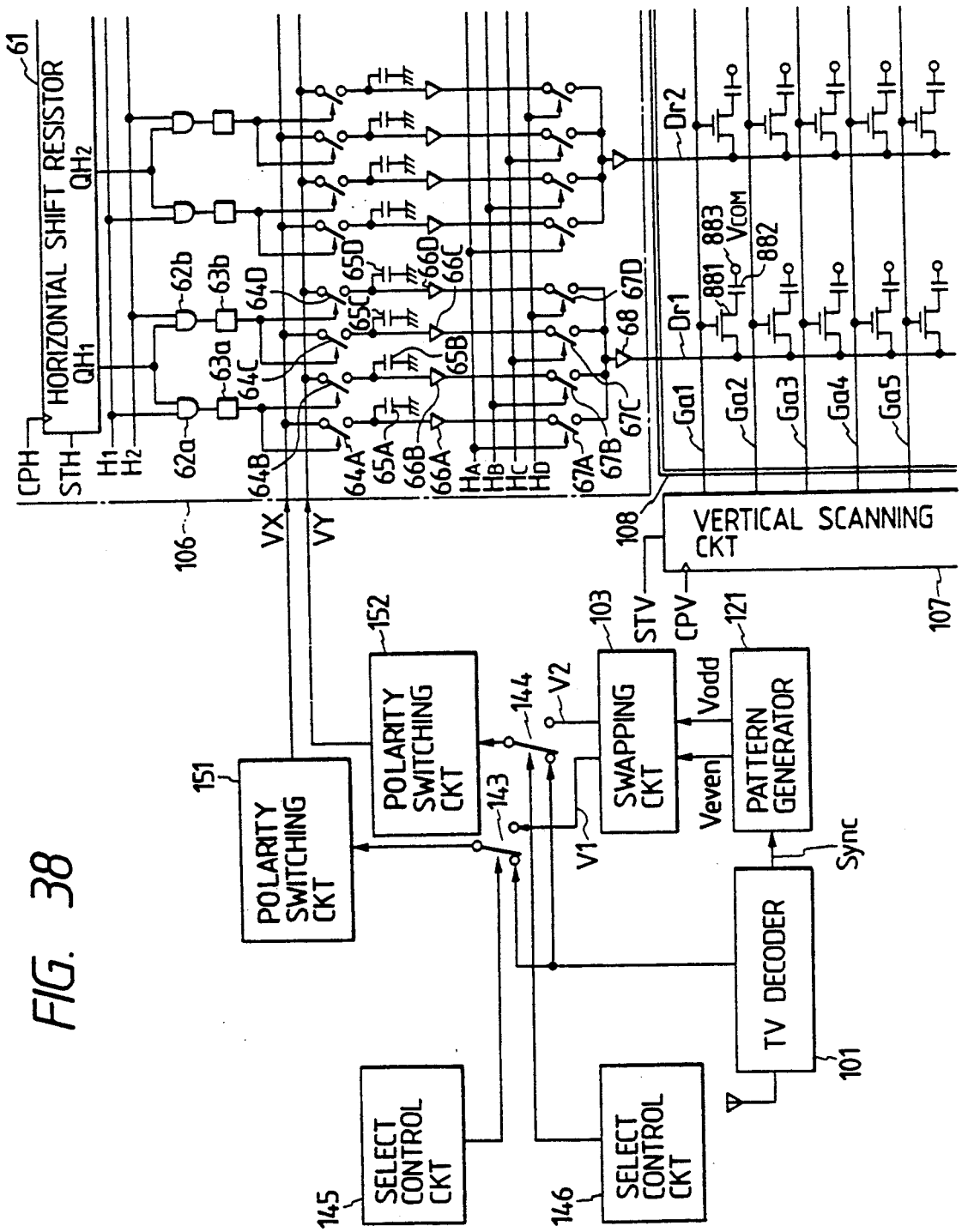
FIG. 38 is a diagram showing a configuration of another embodiment of the present invention.

FIG. 38 is a diagram showing a configuration of another embodiment of the present invention. Since the configuration thereof is virtually the same as that of the embodiment shown in FIG. 33, its point different from what of FIG. 33 will be described.

The adders 14, and 142 in FIG. 33 are replaced by selector switches 143 and 144 in FIG. 38.

More specifically, when the display data of characters and graphics is displayed in the embodiment of FIG. 33, it is added to the picture of the TV signal. Both images are observed with on superimposed on the other. However, in the embodiment of FIG. 38, when the display data of characters and graphics is displayed at a portion, the TV signal is shut off. Only the display data is displayed completely at the portion. Reference numerals 145 and 146 denote select control circuits of respective selector switches 143 and 144. The state of display is changed by the manner of control in the select control circuit 145 and 146.

According to the present invention, when a TV signal and data of characters and graphics arae simultaneously displayed on a liquid crystal display apparatus having vertical pixels whose number is two times as many as the scanning lines in one field of the TV signal, it becomes possible, for the TV signal, to drive two consecutive lines with one horizontal scanning signal and change the combination of the two lines for each field. The effect as obtained in the interlace display can be obtained and the vertical resolution can be enhanced.

On the other hand, for the display data of characters and graphics, when the data is superimposed on the TV signal for each horizontal scanning period, inputs for the odd line and the even line are made different from each other. Hence, it becomes possible to apply the pixels with signals capable of displaying symmetrical and identical image for the first field and the second field. As a result, the trouble result, trouble of sticking does not occur. In addition, good vertical resolution is obtained. Thus, the TV signal and the display data of characters and graphics can be displayed satisfactorily.

What is claimed is:

1. In an image diaplay apparatus including a matrix display panel having image display elements as pixels arranged thereon in a matrix array at the intersecting points of a plurality of horizontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning electrodes in synchronism with the vertical synchronizing period of a signal to be displayed, a horizontal scanning circuit, when the signal to be displayed is a television signal on an interlace scanning system, sequentially using signals stored in a plurality of sample-and-hold circuits, which store the same horizontal scanning signal, for driving said vertically extended signal electrodes a plurality of times during one horizontal scanning period, thereby scanning a plurality of lines of said matrix-arrayed image display elements on the panel surface, and interlace scanning means, during said scanning process, providing a phase difference between the combination of a plurality of lines in the nth field of the television signal and the combination of a plurality of lines in the n+1th field to make interlace scanning possible, whereby the scanning line on said panel surface is converted to that of a multiple-line scanning system and an interlace display of said television signal is achieved, said image display apparatus comprising:

a mixing circuit for outputting a mixed signal obtained by mixing a television signal on an interlace scanning system and a character and graphic signal of such data as characters and graphics on a non-interlace system as a signal to be displayed; and control means, when said signal to be displayed is said mixed signal, stopping the operation of said interlace scanning means and switching the scanning system to a non-interlace scanning system by force, whereby a superimposed display of a character and graphic signal on a television signal in made possible.

2. In an image display apparatus including a matrix display panel having image display elements as pixels arranged thereon in a matrix array at the intersecting points of a plurality of horizontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning electrodes in synchronism with the vertical synchronizing period of a signal to be displayed, a horizontal scanning circuit, when the signal to be displayed is a television signal on an interlace scanning system, sequentially using signals stored in a plurality of sample-and-hold circuits, which store the same horizontal scanning signal, for driving said vertically extended signal electrodes a plurality of times during one horizontal scanning period, thereby scanning k lines of said matrix-arrayed image display elements on the panel surface, and interlace scanning means, during said scanning process, providing a phase difference between the combination of the k lines in the nth field of the television signal and the combination of the k lines in the n+1th field to make interlace scanning possible, whereby the scanning line on said panel surface is converted to that of a multiple-line scanning system and an interlace display of said television signal is achieved, said image display apparatus comprising:

a mixing circuit for outputting a mixed signal obtained by mixing a television signal on an interlace scanning system and a character and graphic signal of such data as characters and graphics on a non-interlace system as a signal to be displayed;

a switching circuit for selecting and outputting one of said television signal, character and graphic signal, and mixed signal as a signal to be displayed; and control means, when said television signal is selected by said switching circuit, allowing said interlace scanning means to function, but, when said mixed signal is selected, stopping said interlace scanning means and swithcing the scanning system to a non-interlace scanning system by force, whereby a display of a television signal, a character and graphic signal, or a character and graphic signal superimposed on a television signal is made possible.

3. An image display apparatus according to claim 2, wherein said mixing circuit, when mixing a television signal on an interlace system with a character and graphic signal on a non-interlace system, delays the television signal by one horizontal scanning period in either of the fields before said television signal is mixed with said character and graphic signal, whereby it is adapted such that interlace scanning for the television signal is maintained even when said control means stops and interlace scanning means and switches the scanning system to a non-interlace scanning system by force upon selection of said mixed signal by said switching circuit.

4. In an image diaplay apparatus including a matrix display panel having image display elements as pixels arranged thereon in a matrix array at the intersecting points of a plurality of horzontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning electrodes in synchronism with the vertical synchronizing period of a signal to be displayed, a horizontal scanning circuit, when the signal to be displayed is a television signal on an interlace scanning system, sequentially using signals stored in a plurality of sample-and-hold circuits, which store the same horizontal scanning signal, for driving said vertically extended signal electrodes a plurality of times during one horizontal scanning period, thereby scanning a plurality of lines of said matrix-arrayed image display elements on the panel surface, and interlace scanning means, during said scanning process, providing a phase difference between the combination of a plurality of lines in the nth field of the television signal and the combination of a plurality of lines in the n+1th field to make interlace scanning possible, whereby the scanning line on said panel surface is converted to that of a multiple-line scanning system and an interlace display of said television signal is achieved, said image display apparatus comprising:

a select output circuit for switching between a television signal on an inerlace scanning system and a character and graphic signal of such data as characters and graphics on a non-interlace system at any desired timing and alternately outputting either one of said signals;

a switching circuit for selecting and outputting one of said television signal, character and graphic signal, and alternately selected output signal from said select output circuit as a signal to be displayed; and control means, when said television signal is selected by said switching circuit, allowing said interlace scanning means to function, but, when said alternately selected output signal is selected, stopping said interlace scanning means and switching the scanning system to a non-interlace scanning system by force, thereby setting a region for displaying the television image and a region for displaying the character and graphic image on the surface of the panel and having each image displayed by non-interlace scanning, whereby a display of a television signal, a character and graphic signal, or a character and graphic signal superimposed on a television signal is made possible.

5. In a liquid crystal display apparatus including a matrix display panel having liquid crystal display elements as pixels arranged thereon in a matrix array at the intersecting points of a plurality of horizontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning elecrodes in synchronism with the vertical synchronizing period of a signal to be displayed, a horizontal scanning circuit, when the signal to be displayed is a television signal on an interlace scanning system, sequentially using signals stored in two sample-and-hold circuits, which store the same horizontal scanning signal, for driving said vertically extended signal electrodes two times during one horizontal scanning period, thereby scanning two lines of said matrix-arrayed liquid crystal display elements on the panel surface, and interlace scanning means, during said scanning process, providing a phase difference between the combination of two lines in the first field of the television signal and the combination of two lines in the second field to make interlace scanning possible, whereby the scanning line on said panel surface is converted to that of a double-line scanning system and an interlace display of said television signal is achieved, said liquid crystal display apparatus comprising:

a mixing circuit for outputting a mixed signal obtained by mixing a television signal on an interlace scanning system and a character and graphic signal of such data as characters and graphics on a non-interlace system as a signal to be displayed; and control means, when said signal to be displayed is said mixed signal, stopping the operation of said interlace scanning means and switching the scanning system to a non-interlace scanning system by force, whereby a superimposed display of a character and graphic signal on a television signal is made possible.

6. A liquid crystal display apparatus according to claim 5, wherein said control means includes a field discriminating circuit of the signal to be displayed, an interlace/non-interlace discriminating circuit of the signal to be displayed, and an input terminal of an instruction signal for switching to forced non-interlace scanning.

7. In a liquid crystal display apparatus including a matrix display panel having liquid crystal display elements as pixels arranged thereon in a matrix array at the intersecting points of a plurality of horizontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning electrodes in synchronism with the vertical synchronizing period of a signal to be displayed, a horizontal scanning circuit, when the signal to be displayed is a television signal on an interlace scanning system, sequentially using signals stored in two sample-and-hold circuits, which store the same horizontal scanning signal, for driving said vertically extended signal electrodes two times during one horizontal scanning period, thereby scanning two lines of said matrix-arrayed liquid crystal display elements on the panel surface, and interlace scanning means, during said scanning process, providing a phase difference between the combination of two lines in the first field of the television signal and the combination of two lines in the second field to make interlace scanning possible, whereby the scanning line on said panel surface is converted to that of a double-line scanning system and an interlace display of said television signal is achieved, said liquid crystal display apparatus comprising:

a mixing circuit for outputting a mixed signal obtained by mixing a television signal on an interlace scanning system and a character and graphic signal of such data as characters and graphics on a non-interlace system as a signal to be displayed;

a switching circuit for selecting and outputting one of said television signal, character and graphic signal, and mixed signal as a signal to be displayed; and control means, when said television signal is selected by said switching circuit, allowing said interlace scanning means to function, but, when said mixed signal is selected, stopping said interlace scanning means and switching the scanning system to a non-interlace scanning system by force, whereby a display of a television signal, a character and graphic signal, or a character and graphic signal superimposed on a television signal is made possible.

8. An liquid crystal apparatus according to claim 7, wherein said mixing circuit, when mixing a television signal on an interlace system with a character and graphic signal on a non-interlace system, delays the television signal by one horizontal scanning period in either of the fields before said television signal is mixed with said character and graphic signal, whereby it is adapted such that interlace scanning for the television signal is maintained even when said control means stops said interlace scanning means and switches the scanning system to a non-interlace scanning system by force upon selection of said mixed signal by said switching circuit.

9. A liquid crystal display apparatus according to claim 8, wherein said control means includes a field discriminating circuit of the signal to be displayed, an interlace/non-interlace discriminating circuit of the signal to be displayed, and an input terminal of an instruction signal for switching to forced non-interlace scanning.

10. A liquid crystal display apparatus according to claim 7, wherein said control means includes a field discriminating circuit of the signal to be displayed, an interlace/non-interlace discriminating circuit of the signal to be displayed, and an input terminal of an instruction signal for switching to forced non-interlace scanning.

11. In a liquid crystal display apparatus including a matrix display panel having liquid crystal display elements as pixels arranged thereon in a matrix array at the intersecting points of a plurality of horizontally extended scanning electrodes and a plurality of vertically extended signal electrodes and adapted such that said display element is driven when both the electrodes are driven simultaneously, a vertical scanning circuit connected with said horizontally extended scanning electrodes for driving said scanning electrodes in synchronism with the vertical synchronizing period of a signal to be displayed, a horizontal scanning circuit, when the signal to be displayed is a television signal on an interlace scanning system, sequentially using signals stored in two sample-and-hold circuits, which store the same horizontal scanning signal, for driving said vertically extended signal electrodes two times during one horizontal scanning period, thereby scanning two lines of said matrix-arrayed liquid crystal display elements on the panel surface, and interlace scanning means, during said scanning process, providing a phase difference between the combination of two lines in the first field of the television signal and the combination of two lines in the second field to make interlace scanning possible, whereby the scanning line on said panel surface is converted to that of a double-line scanning system and an interlace display of said television signal is achieved, said liquid crystal display apparatus comprising:

a select output circuit for switching between a television signal on an interlace scanning system and a character and graphic signal of such data as characters and graphics on a non-interlace system at any desired timing and alternately outputting either one of said signals;

a switching circuit for selecting and outputting one of said television signal, character and graphic signal, and alternately selected output signal from said select output circuit as a signal to be displayed; and control means, when said television signal is selected by said switching circuit, allowing said interlace scanning means to function, but, when said alternately selected output signal is selected, stopping said interlace scanning means and switching the scanning system to a non-interlace scanning system by force, thereby setting a region for displaying the television image and a region for displaying the character and graphic image on the surface of the panel and having each image displayed by non-interlace scanning, whereby a display of a television signal, a character and graphic signal, or a character and graphic signal superimposed on a television signal is made possible.

12. A liquid crystal display apparatus according to claim 11, wherein said control means includes a field discriminating circuit of the signal to be displayed, an interlace/non-interlace discriminating circuit of the signal to be displayed, and an input terminal of an instruction signal for switching to forced non-interlace scanning.

13. In a liquid crystal display apparatus having a display surface with liquid crystal display elements as pixels arranged thereon at intersecting points of rows in the horizontal direction and columns in the vertical direction in a matrix array and adapted such that, when a television signal on an interlace system is input thereto, the same horizontal scanning signal is used in the first field for a plurality of times of horizontal scanning for driving the liquid crystal display elements in a plurality of rows in the horizontal direction, and, in the second field, the same horizontal scanning signal whose phase is shifted from that of the signal for the first field on account of interlace scanning is used for a plurality of times of horizontal scanning for driving the liquid crystal display elements in a plurality of rows in the horizontal direction, whereby the scanning line on the display surface is converted to that of a multiple-line scanning system and an interlace display of the television signal is achieved, said liquid crystal display apparatus comprising:

means, when a display signal on a non-interlace scanning system of such data as characters and graphics to be displayed superimposed on said television signal is input, superimposing the display signal as it is on the television signal in the first field, and, in the second field, generating a display signal by shifting the phase of the display signal for the first field by the quantity corresponding to the shift in the phase due to the interlace scanning of the television signal and superimposing the thus generated display signal on the television signal, thereby achieving a non-interlace display of the display signal on the display surface.

14. In a liquid crystal display apparatus having a display surface with liquid crystal display elements as pixels arranged thereon at intersecting points of column signal lines in the vertical direction and row signal lines in the horizontal direction in a matrix array and adapted such that said liquid crystal display element is driven when both of said signal lines are simultaneously driven, a vertical scanning circuit for driving said row signal lines in the horizontal direction in synchronism with the vertical scanning period of a television signal to be displayed, a horizontal scanning circuit for sequentially driving said column signal lines in the vertical direction a plurality of times during one horizontal scanning period of the television signal to be displayed using signals stored in a plurality of sample-and-hold circuits, which store the same horizontal scanning signal supplied thereto through a plurality of paths, and a television signal source for supplying the same television signal to said plurality of paths led to said plurality of sample-and-hold circuits, whereby the scanning line on the display surface is converted to that of a multiple-line scanning system and an interlace display of the television signal is achieved, said liquid crystal display apparatus comprising:

a pattern generator for generating a display signal on a non-interlace scanning system of such data as characters and graphics in synchronism with said television signal source, an adder for providing the same display signal generated from said pattern generator to said plurality of paths led to said plurality of sample-and-hold circuits so that the display signal is added to said television signal and displayed superimposed on said television signal, and means, at the time of the addition, swapping said display signals so that displays on the display surface of said display signals are exchanged for the odd line and even line of one horizontal scanning line.

15. A liquid crystal display apparatus according to claim 14, wherein a selector switch for selectively outputting the television signal and the display signal and selection control means thereof are provided instead of said adder for adding the display signal to the television signal.

16. A liquid crystal display apparatus according to claim 15, wherein said selection control means is formed of means for controlling said selector switch depending on the content of the display signal input to said selector switch so that said selector switch selects and outputs the display signal only when the display signal has a specific content.

17. A liquid crystal display apparatus according to claim 15, wherein said selection control means is formed of means for controlling said selector switch to select and output the display signal at specific timing synchronized with horizontal and vertical scanning of the television signal, i.e., at a specific position on the picture image on the display surface.

18. In a liquid crystal display apparatus having a display surface with liquid crystal display elements as pixels arranged thereon in a matrix array at intersecting points of column signal lines in the vertical direction and row signal lines in the horizontal direction and adapted such that said liquid crystal display element is driven when both of said signal lines are simultaneously driven, a first horizontal/vertical scanning circuit for driving said column signal lines in the vertical direction and row signal lines in the horizontal direction in synchronism with a television signal to be displayed such that the liquid crystal display elements along the odd lines in the horizontal direction on said display surface are driven, a second horizontal/vertical scanning circuit for driving said column signal lines in the vertical direction and row signal lines in the horizontal direction in synchronism with a television signal to be displayed such that the liquid crystal display elements along the even lines in the horizontal direction on said display surface are driven, a television signal source for supplying the same television signal to said first and second horizontal/vertical scanning circuits through a first and a second path independent of each other, and means for having the timing of scanning by said independent first and second vertical scanning circuits relatively shifted for each field, whereby the scanning line on the display surface is converted to that of a double-line scanning system and an interlace display of the television signal is achieved, said liquid crystal display apparatus comprising:

a pattern generator for generating a display signal on a non-interlace scanning system for such data as characters and graphics divided into that to be displayed in an odd line and that to be displayed in an even line on said display surface, these signals being independent of each other and in synchronism with said television signal source, and an adder having the display signal generated from said pattern generator to be displayed in an odd line delivered to the first path led to said first horizontal/vertical scanning circuit for driving odd lines so as to be added to the television signal and having the display signal generated from said pattern generator to be displayed in an even line delivered to the second path led to said second horizontal/vertical scanning circuit for driving even lines so as to be added to the television signal, thereby making said display signal displayed superimposed on said television signal on said display surface.

19. A liquid crystal display apparatus according to claim 18, wherein a selector switch for selectively outputting the television signal and the display signal and selection control means thereof are provided instead of said added for adding the display signal to the television signal.

* * * * *

UNITED STATES PATENT AND TRADEMARK OFFICE
CERTIFICATE OF CORRECTION

PATENT NO. : 5,091,784
DATED : February 25, 1992
INVENTOR(S) : Ryuuichi Someya, et al.

It is certified that error appears in the above-identified patent and that said Letters Patent is hereby corrected as shown below:

Claim 1, column 25, line 55, delete "in" and replace with --is--.

Claim 8, column 28, line 55, delete "An" and replace with --A--.

Claim 14, column 31, line 2, before "swapping" insert --for--.

Claim 19, column 32, line 39, delete "added" and replace with --adder--.

Signed and Sealed this

Twenty-fifth Day of May, 1993

Attest:

MICHAEL K. KIRK

*Attesting Officer*   *Acting Commissioner of Patents and Trademarks*